(12) United States Patent
Mascolo et al.

(10) Patent No.: US 8,558,101 B2
(45) Date of Patent: Oct. 15, 2013

(54) SUPPORTED PV MODULE ASSEMBLY

(75) Inventors: Gianluigi Mascolo, Danville, CA (US); David F. Taggart, San Carlos, CA (US); Jonathan D. Botkin, El Cerrito, CA (US); Christopher S. Edgett, Oakland, CA (US)

(73) Assignee: SunPower Corporation, San Jose, CA (US)

( * ) Notice: Subject to any disclaimer, the term of this patent is extended or adjusted under 35 U.S.C. 154(b) by 559 days.

(21) Appl. No.: 11/616,575

(22) Filed: Dec. 27, 2006

(65) Prior Publication Data
US 2007/0144575 A1  Jun. 28, 2007

Related U.S. Application Data

(63) Continuation-in-part of application No. 10/922,117, filed on Aug. 19, 2004.

(60) Provisional application No. 60/754,350, filed on Dec. 28, 2005, provisional application No. 60/496,476, filed on Aug. 20, 2003, provisional application No. 60/517,438, filed on Nov. 5, 2003.

(51) Int. Cl.
*H01L 33/00* (2010.01)

(52) U.S. Cl.
USPC .......................................... 136/243; 52/91.3

(58) Field of Classification Search
USPC ....................................................... 136/244
See application file for complete search history.

(56) References Cited

U.S. PATENT DOCUMENTS

| | | | |
|---|---|---|---|
| 4,421,943 A | 12/1983 | Withjack | |
| 5,112,408 A * | 5/1992 | Melchior | 136/251 |
| 5,316,592 A | 5/1994 | Dinwoodie | |
| 5,505,788 A | 4/1996 | Dinwoodie | |
| 5,647,915 A | 7/1997 | Zukerman | |

(Continued)

FOREIGN PATENT DOCUMENTS

| | | | | |
|---|---|---|---|---|
| JP | 09217471 A * | 8/1997 | | 136/243 |
| JP | 2000064523 | 2/2000 | | |

(Continued)

OTHER PUBLICATIONS

M. Kano, T, Kondo, A. Hasegawa, machine translation of JP 09-217471A, 1997.*

(Continued)

*Primary Examiner* — Miriam Berdichevsky
(74) *Attorney, Agent, or Firm* — Knobbe Martens Olson & Bear LLP

(57) ABSTRACT

A supported PV assembly may include a PV module comprising a PV panel and PV module supports including module supports having a support surface supporting the module, a module registration member engaging the PV module to properly position the PV module on the module support, and a mounting element. In some embodiments the PV module registration members engage only the external surfaces of the PV modules at the corners. In some embodiments the assembly includes a wind deflector with ballast secured to a least one of the PV module supports and the wind deflector. An array of the assemblies can be secured to one another at their corners to prevent horizontal separation of the adjacent corners while permitting the PV modules to flex relative to one another so to permit the array of PV modules to follow a contour of the support surface.

16 Claims, 21 Drawing Sheets

(56) References Cited

U.S. PATENT DOCUMENTS

| | | |
|---|---|---|
| 5,746,839 A | 5/1998 | Dinwoodie |
| 6,046,399 A * | 4/2000 | Kapner .................. 136/244 |
| 6,061,978 A | 5/2000 | Dinwoodie et al. |
| 6,119,415 A | 9/2000 | Rinklake et al. |
| 6,148,570 A | 11/2000 | Dinwoodie et al. |
| 6,495,750 B1 | 12/2002 | Dinwoodie |
| 6,501,013 B1 | 12/2002 | Dinwoodie |
| 6,534,703 B2 | 3/2003 | Dinwoodie |
| 6,570,084 B2 | 5/2003 | Dinwoodie |
| 6,672,018 B2 | 1/2004 | Shingleton |
| 6,809,251 B2 | 10/2004 | Dinwoodie |
| 6,959,520 B2 | 11/2005 | Hartman |
| 7,155,870 B2 | 1/2007 | Almy |
| 2001/0050101 A1 | 12/2001 | Makita et al. |
| 2004/0000334 A1 | 1/2004 | Ressler |
| 2004/0124711 A1 | 7/2004 | Muchow et al. |
| 2004/0250491 A1 | 12/2004 | Diaz et al. |
| 2005/0126621 A1 | 6/2005 | Dinwoodie et al. |
| 2005/0217716 A1 | 10/2005 | Masuda et al. |
| 2006/0042683 A1 | 3/2006 | Gangemi |
| 2007/0151594 A1 | 7/2007 | Mascolo et al. |

FOREIGN PATENT DOCUMENTS

| | | |
|---|---|---|
| JP | 2000-208802 | 7/2000 |
| JP | 2000208802 A | 7/2000 |
| JP | 2000208803 | 7/2000 |
| WO | 03-044299 A2 | 5/2003 |
| WO | 2005020290 A2 | 3/2005 |
| WO | 2006-007212 A2 | 1/2006 |

OTHER PUBLICATIONS

International Search Report and Written Opinion for PCT Application No. PCT/US06/62628 mailed on Feb. 14, 2008.
Notice of Acceptance in corresponding Australian Patent Application No. 2006332511; dated Oct. 20, 2010; 3 pages.
Search Report for AU Application No. 2006332511; Nov. 9, 2009; 3 pages.

* cited by examiner

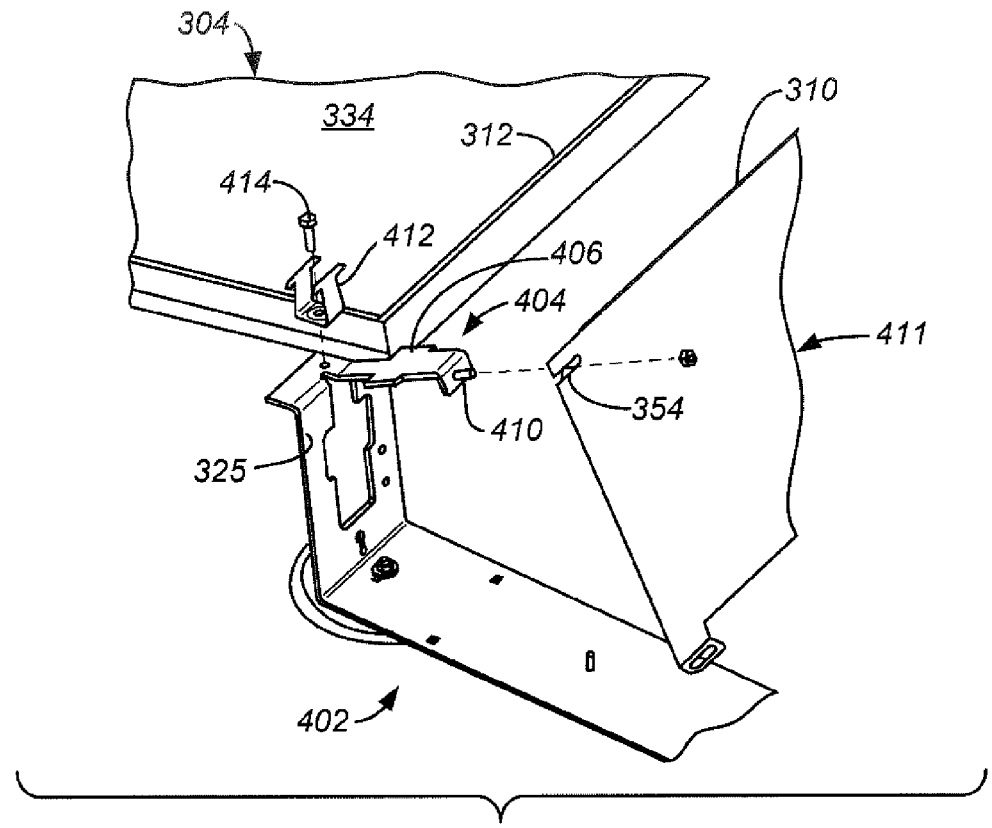
FIG. 31
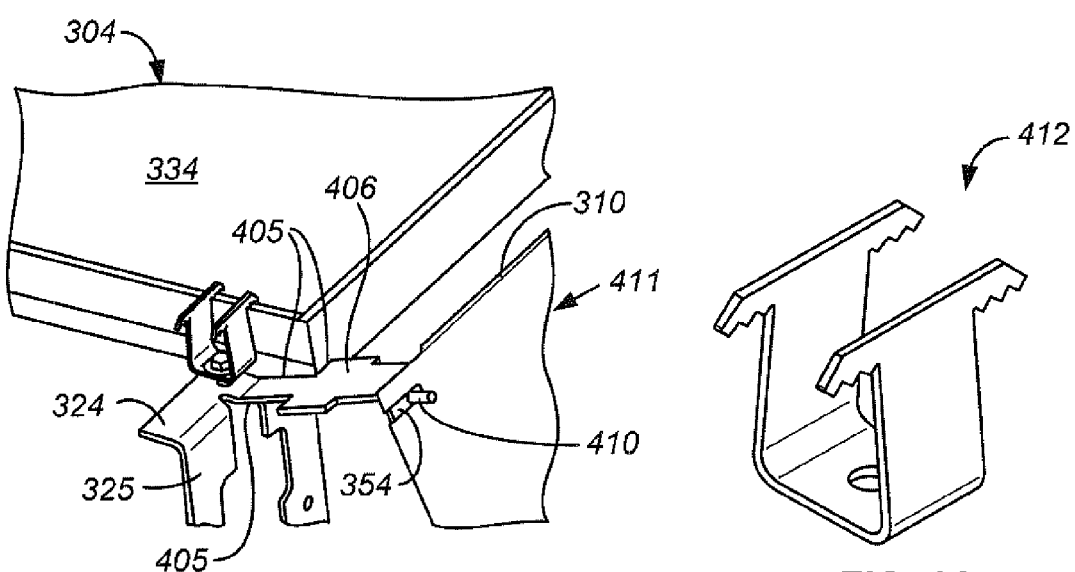
FIG. 32
FIG. 33

# SUPPORTED PV MODULE ASSEMBLY

CROSS REFERENCE TO OTHER APPLICATIONS

This application claims the benefit of provisional patent application No. 60/754,350 filed 28 Dec. 2005, and entitled Supported PV Module Assembly. This is also a continuation in part of patent application Ser. No. 10/922,117 filed on 19 Aug. 2004, and entitled PV Wind Performance Enhancing Methods and Apparatus, which application claims the benefit of provisional patent application No. 60/496,476 filed Aug. 20, 2003 and provisional patent application No. 60/517,438 filed Nov. 5, 2003.

STATEMENT REGARDING STATE AND FEDERALLY SPONSORED RESEARCH OR DEVELOPMENT

This invention was made with Government support under Contract No. DE-AC36-99GO10337 awarded by the United States Department of Energy. The Government has certain rights in the invention. This invention was made with State of California support under the California Energy Commission Agreement Number 500-00-034. The Energy Commission has certain rights to this invention.

BACKGROUND OF THE INVENTION

Air moving across an array of photovoltaic (PV) assemblies mounted to the roof of a building, or other support surface, creates wind uplift forces on the PV assemblies. Much work has been done in the design and evaluation of arrays of PV assemblies to minimize wind uplift forces. See U.S. Pat. Nos. 5,316,592; 5,505,788; 5,746,839; 6,061,978; 6,148,570; 6,495,750; 6,534,703; 6,501,013 and 6,570,084. Reducing wind uplift forces provides several advantages. First, it reduces the necessary weight per unit area of the array. This reduces or eliminates the need for strengthening the support surface to support the weight of the array, thus making retrofit easier and reducing the cost for both retrofit and new construction. Second, it reduces or eliminates the need for the use of roof membrane- (or other support surface-) penetrating fasteners; this helps to maintain the integrity of the membrane. Third, the cost of transporting and installing the assembly is reduced because of its decreased weight. Fourth, lightweight PV assemblies are easier to install that assemblies that rely on heavy ballast weight to counteract wind uplift forces. Fifth, when appropriately designed, the assembly can serve as a protective layer over the roof membrane or support surface, shielding from temperature extremes and ultraviolet radiation.

BRIEF SUMMARY OF THE INVENTION

A first embodiment of a supported PV assembly includes a PV module comprising a PV panel and PV module support assemblies. At least some of the PV module support assemblies comprise a base and a module support extending from the base. The module support includes a support surface supporting the module, a module registration member engaging the PV module to properly position the PV module on the module support, and a mounting element securing the PV module to at least one of the base and the frame support. In some embodiments the PV module comprises external surfaces at the corners thereof with the module support comprising PV module registration members engaging only the external surfaces of the PV modules at the corners.

A second embodiment of a supported PV assembly includes a PV module comprising a PV panel and a plurality of PV module support assemblies. At least some of the support assemblies comprise a module support securing the PV module to a base, a support pad at the lower surface of the base, and a thermal expansion and contraction movement-accommodating joint securing the support pad to the base. This permits relative movement between the base and the pad in at least one direction parallel to the lower surface of the base.

A third embodiment of a supported PV assembly includes a plurality of PV module supports secured to a PV module for placing the PV module at an angle to a horizontal so that the PV module has a lower, south edge and an upper, north edge. A wind deflector is coupled to the PV module opposite the upper, north edge of the PV module. A ballast is secured to a least one of the PV module supports and the wind deflector. For example, the ballast can be secured beneath the inner surface of the wind deflector.

An embodiment of a PV installation includes an array of PV modules and a PV module support assembly secured to each of the first, second, third and fourth corners of the first, second, third and fourth PV modules. The PV module support assembly is constructed to prevent horizontal separation of the adjacent corners while permitting the PV modules to flex relative to one another so to permit the array of PV modules to follow a contour of a support surface. In some embodiments the PV module support assembly comprises PV module registration members engaging only the external surfaces of the PV modules at the corners.

A second embodiment of a PV installation includes an array of PV modules comprising rows and columns of PV modules, the modules having first, second, third and fourth corners adjacent to one another. The installation also includes a PV module support assembly secured to the first, second, third and fourth corners of adjacent PV modules. Row stabilizing members connect the PV module support assemblies to one another along at least first and second of the rows. Column stabilizing members connect the PV module support assemblies to one another along at least first and second of the columns. In some embodiments the row stabilizing members comprise rigid members. In some embodiments the column stabilizing members comprise flexible members placed in tension.

A third embodiment of a PV installation includes an array of PV modules, including first and second rows of PV modules, mounted to a support surface. The upper, north edges of the first row of PV modules are positioned opposite the lower, south edges of the second row of PV modules respectively. PV module support assemblies are secured to the upper, north edges of the first row of PV modules and to the lower, south edges of the second row of PV modules respectively so that the upper, north edges are positioned farther from the support surface than the lower, south edges. Wind deflectors are secured to at least one PV module support assembly opposite the upper, north edge of the first and fourth PV modules. The PV module support assemblies are constructed to prevent horizontal separation of the PV assemblies of the first and second row from one another while permitting the PV module support assemblies to flex relative to one another so to permit the array of PV modules to follow a contour of a support surface.

One example of a method for mounting a PV module onto a support surface is carried out as follows. PV module supports, having PV module registration members, are selected.

The PV module supports are positioned at chosen locations on a support surface. A PV module is aligned with a set of the PV module supports. The PV module is guided into engagement with the set of PV module supports using the PV module registration members. The PV module is secured to the set of PV module supports using mounting elements. In some embodiments a wind deflector is secured to the PV module supports following the PV module securing step; ballast may be mounted to an inner surface of the wind deflector by, for example, sliding the ballast sideways along the inner surface of the wind deflector.

One aspect of the present invention is the recognition that there are substantial advantages to be gained from designing a relatively lightweight PV assembly (typically about 2 to 4 pounds per square foot, that is about 9.76 to 19.52 kilograms per square meter) that can be mounted directly to a roof or other support surface without roof penetrations using a minimal number of parts, simple tools and a straightforward installation process. Another aspect of the present invention is the recognition that a number of advantages can be achieved by placing an array of lightweight PV module support assemblies at appropriate positions on the support surface and then mounting the PV modules directly to the support assemblies using simple mounting elements. According to some embodiments, side (east and west facing) and rear (north facing) wind deflectors are also mounted directly to the support assemblies. Through the appropriate design of the support assemblies, the support assemblies and the PV modules can be shipped to the user separately to limit the amount of handling required. This helps reduce the number of times the support assemblies must be shipped thus reducing cost as well as carbon dioxide emissions during transport. A further advantage results from some embodiments in which the PV modules are simultaneously mechanically interlocked and electrically grounded by the mounting elements. While the present invention is primarily designed for use with tilted or angled PV assemblies, it can also be used for flat or horizontally oriented PV assemblies.

Various features and advantages of the invention will appear from the following description in which the preferred embodiments have been set forth in detail in conjunction with the accompanying drawings.

BRIEF DESCRIPTION OF THE DRAWINGS

FIGS. 13-24 disclose further aspects of the invention, in which FIG. 13 illustrates an exploded isometric view of a supported PV assembly made according to the invention;

FIG. 14 is an enlarged isometric view of the PV module support assembly of FIG. 13;

FIGS. 15 and 16 are enlarged isometric views of the north edge and south edge mounting elements of FIG. 13;

FIGS. 17 and 18 are partial exploded isometric views of a supported PV assembly in which PV module support assemblies of FIG. 13 are replaced by south side and north side PV module support assemblies, respectively;

FIG. 19 is an enlarged exploded isometric view of the north side support assembly of FIG. 18 illustrating the movement-accommodating joint between the pads and the base of the support assembly;

FIG. 20 illustrates mounting side deflectors onto a PV module;

FIGS. 21 and 22 are top and isometric views of a two panel array of supported PV assemblies including rear and side air deflectors;

FIG. 23 illustrates an array of PV module support assemblies of FIGS. 13-19;

FIG. 24 is a schematic top view of a 2×2 array of PV modules mounted to the support assemblies of FIG. 23;

FIGS. 31 and 32 illustrate the use of the support assembly of FIG. 30;

FIG. 33 shows an alternative embodiment to the clips of FIGS. 15 and 16;

DETAILED DESCRIPTION OF THE INVENTION

Figure 1:
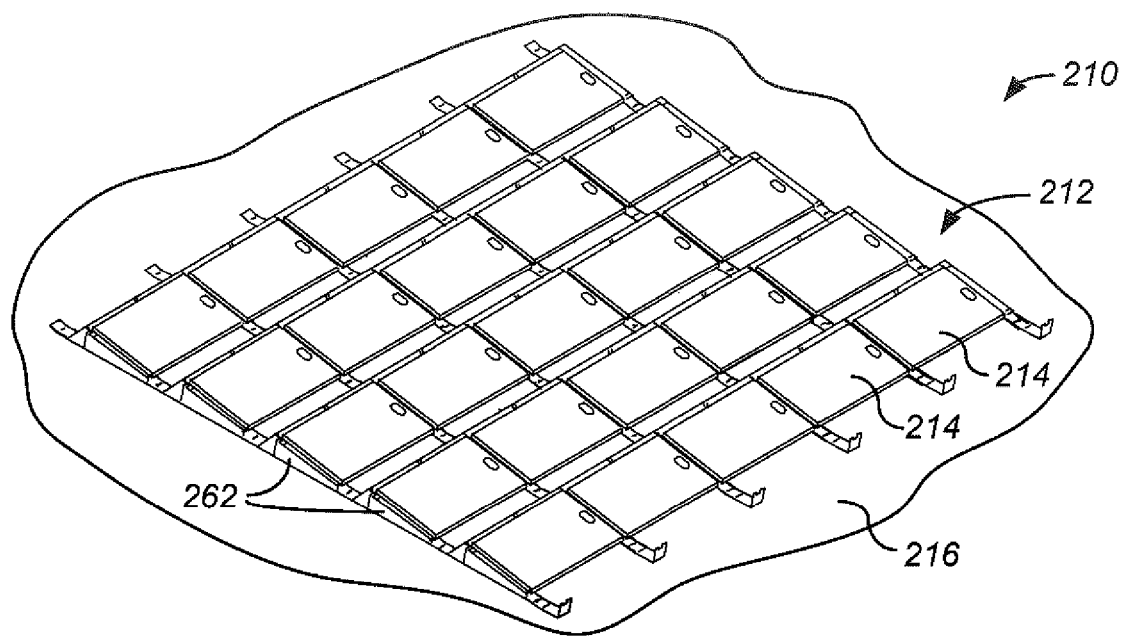
FIGS. 1 and 2 are isometric and plan views of an array of sloped PV modules made according to the invention facilitate field assembly.

The following description of the invention will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Figure 2:
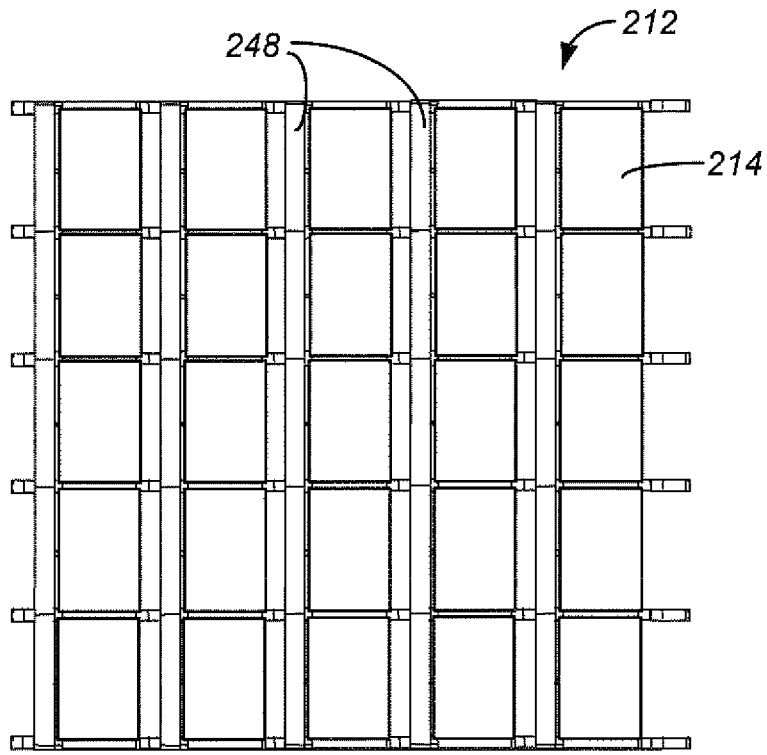
Figure 3:
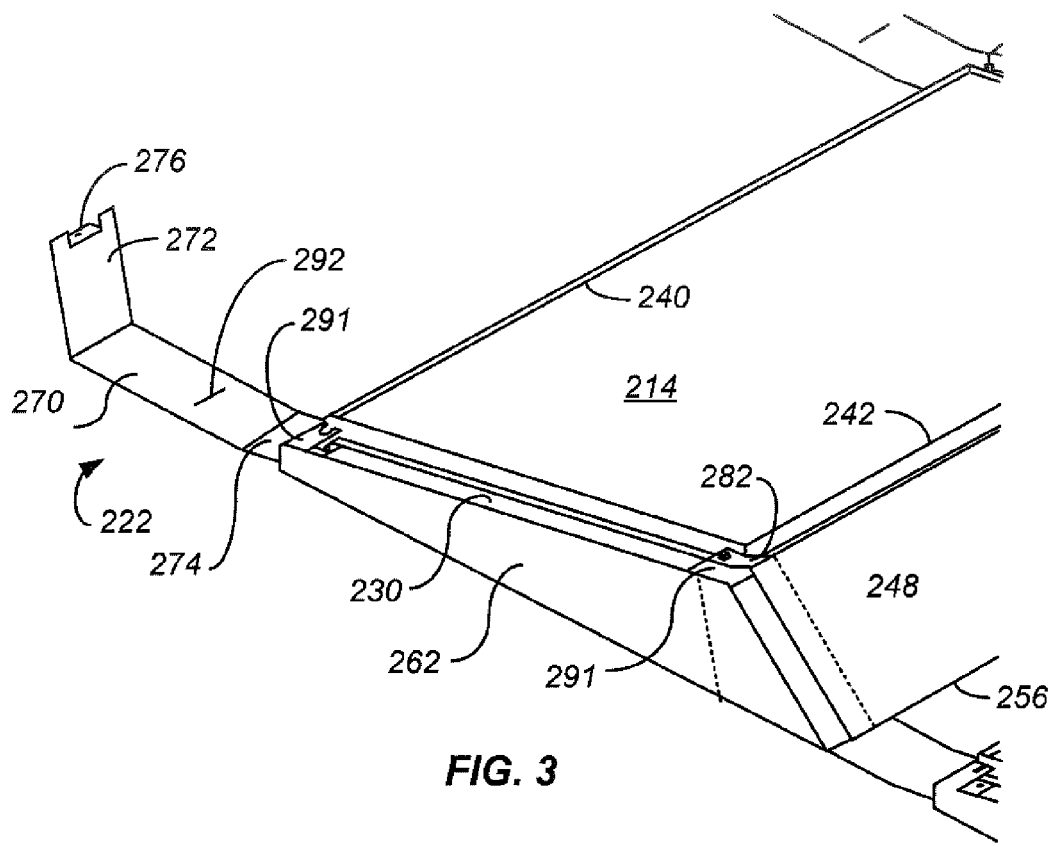
FIGS. 3, 4 and 5 are is enlarged views of different portions of the assembly of FIG. 1.
Figure 4:
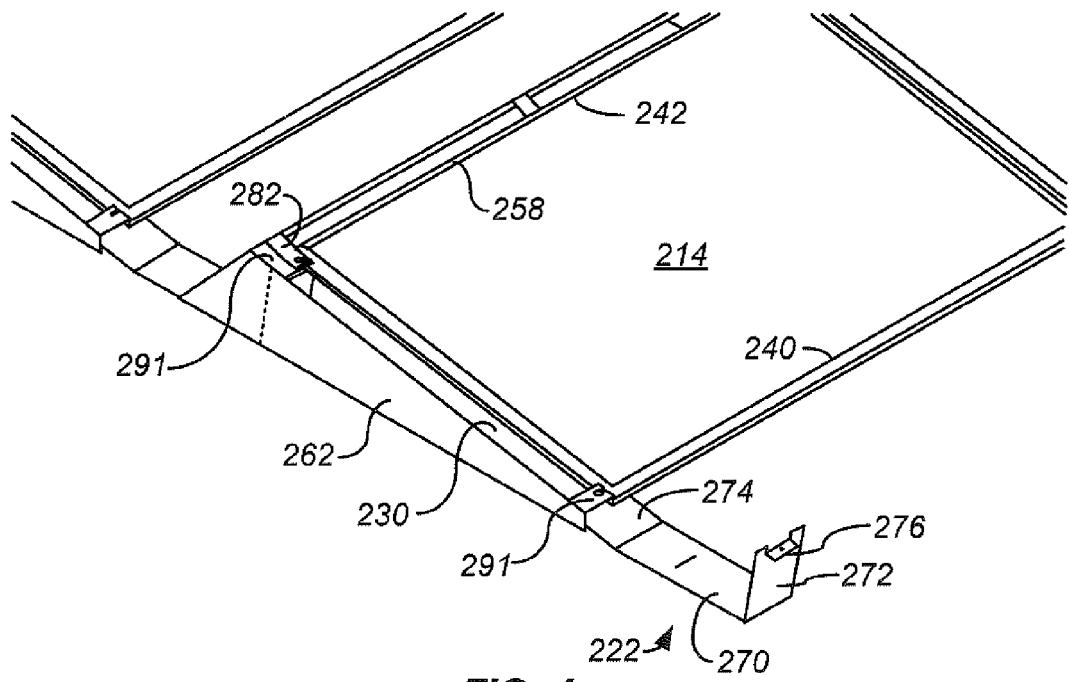
Figure 5:
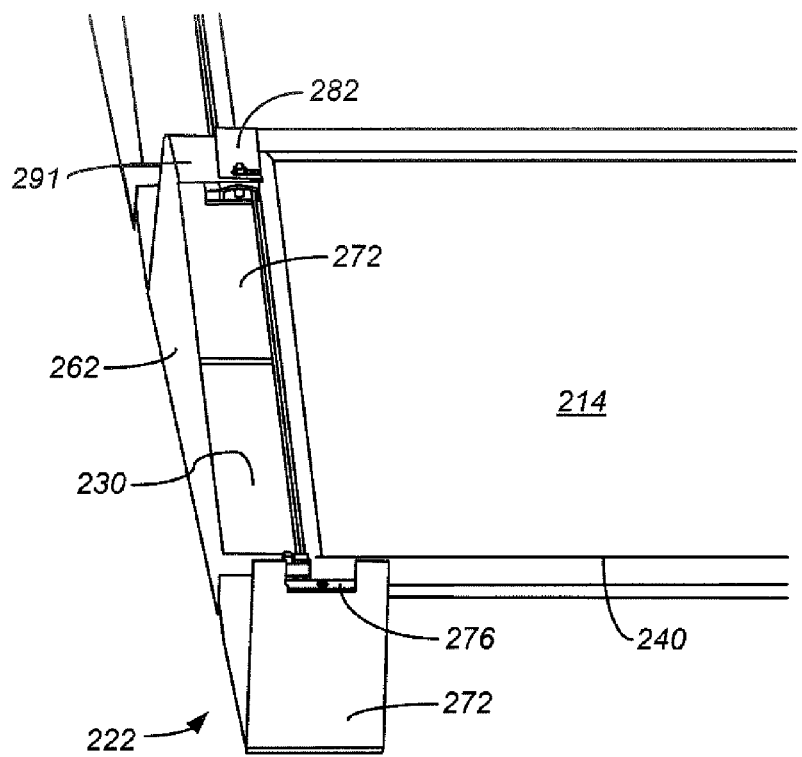
Figure 6:
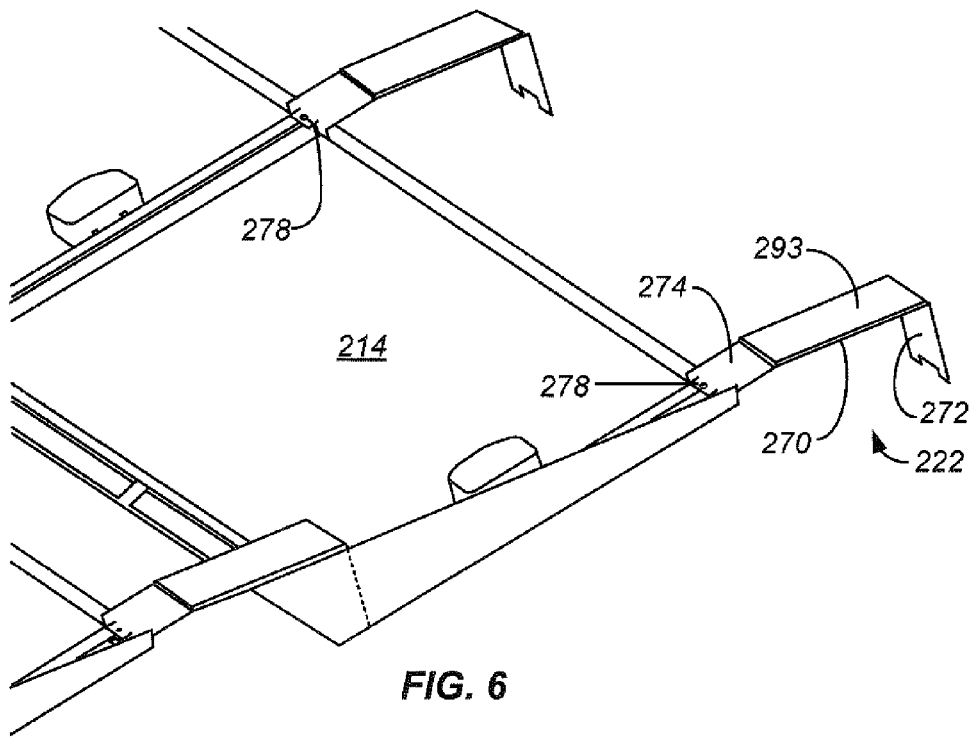
FIG. 6 is underside view of the structure of FIG. 5.
Figure 7:
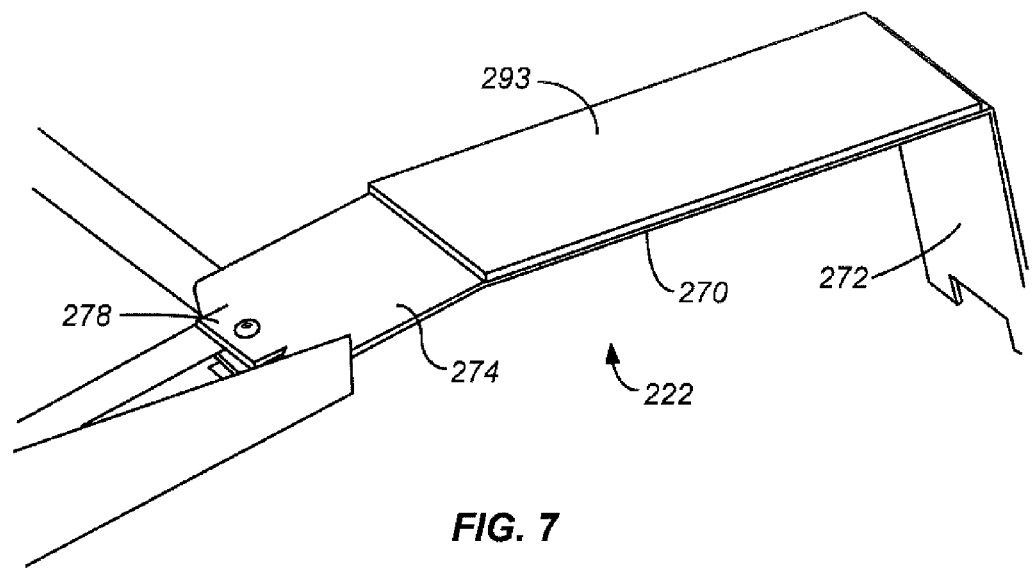
FIG. 7 is enlarged view of a portion of the structure of FIG. 6 showing the end-most support with the upper support arm not attached to anything.
Figure 8:
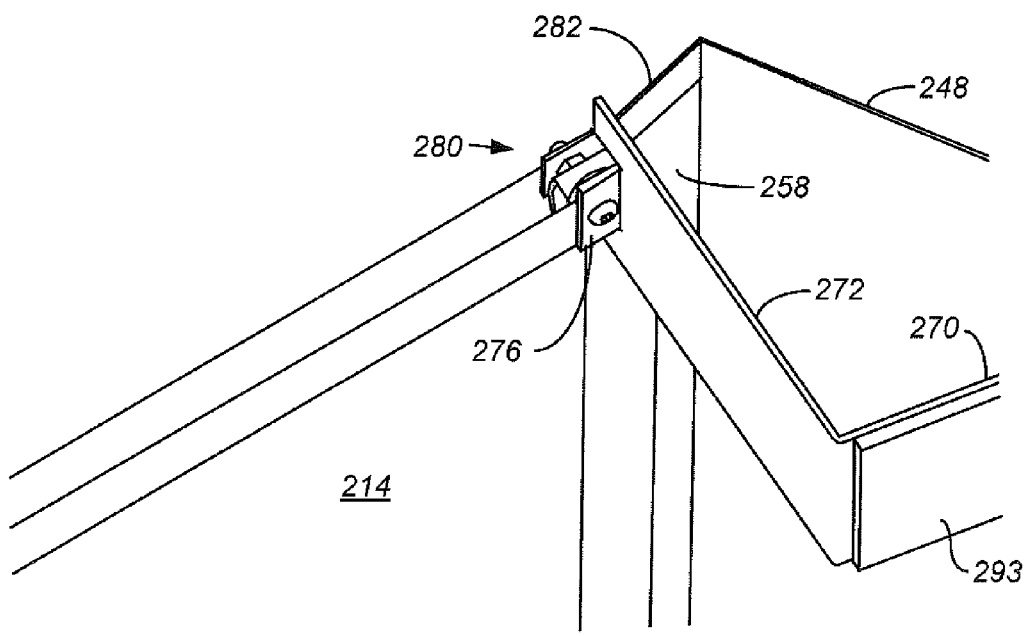
FIG. 8 is an underside, reverse angle view of the uppermost support of FIG. 5 illustrating its attachment to a fastener.

FIGS. 1 and 2 disclose a PV installation 210 including an array 212 of sloped PV modules 214. Supports 222, see FIG. 3, are used to both support PV module 214 and to secure adjacent PV modules to one another. Each support 222 comprises a base 270, an upwardly extending upper edge support arm 272 and a moderately sloped lower edge support arm 274. Support arms 272, 274 each have an apertured tab 276, 278 (see FIGS. 4 and 6) extending therefrom used to support PV module 214 at upper and lower edges 242, 240 of PV module 214. Sloped PV modules 214 are typically oriented to face the sun. That is, in the northern hemisphere, lower edge 240 may be considered the lower, south edge while upper edge 242 may be considered the upper, north edge. In the southern hemisphere, lower edge 240 may be considered the lower, north edge while upper edge 242 may be considered the upper, south edge.

Figure 9:
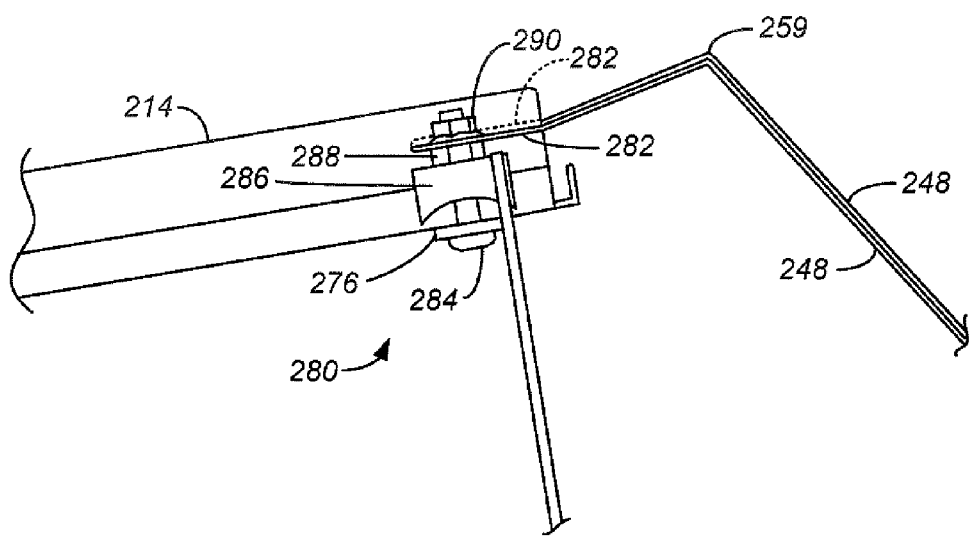
FIG. 9 is an enlarged side view showing the junction of a PV module and the overlapping edges of adjacent air deflectors.

FIG. 9 illustrates fastening of upper edges 242 of two adjacent PV modules 214 to apertured tab 276 of upper support arm 272 and the overlapping apertured tabs 282 of two adjacent (and slightly overlapping) rear air deflectors 248 by a fastener 280. Fastener 280 includes a threaded stud 284, secured to and extending outwardly from tab 276, and a grounding clip 286, driven towards tab 276 by an inner nut 288. A metallic portion of each of the adjacent PV modules 214 is captured between clip 286 and tab 276. Apertured tabs 282 of rear air deflectors 248 are captured between an outer flange nut 290 and inner nut 288. The lower edge 256 of rear air deflector 248 has a tab which engages a slot 292 formed in base 270 of support 222. The lower edge 240 of PV module 214 is secured to support 222 using tab 278 and a fastener, similar to fastener 280, including a stud extending from tab 278, a grounding clip and a nut. Other mounting structures may also be used.

In the embodiment of FIGS. 1-10, PV modules 214 within each row of PV modules are adjacent to one another so that there is a small air gap between them. However, side air deflectors 262 are secured to PV module 214 along the lateral edges of array 212. Side air deflectors 262 have inwardly extending slotted tabs 291 which are engaged by the fasteners along lower and upper edges 240 and 242 of PV modules 214. An air gap 230 is formed between side air deflectors 262 and the adjacent edges of PV module 214. The use of rear air deflectors 248 and side air deflectors 262 is important to reduce wind uplift forces on sloped PV modules 214.

Figure 10:
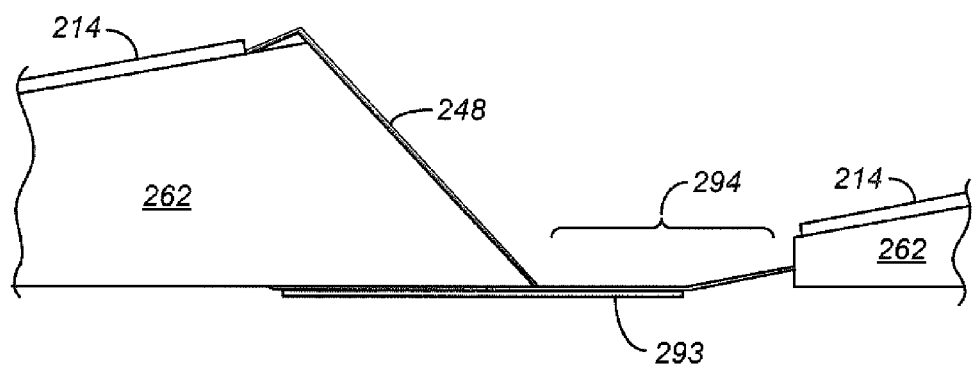
FIG. 10 is an enlarged side view of a portion of the structure of FIG. 1.

Support 222 is typically a bent metal support made of, for example, sheet metal, bent aluminum, extruded aluminum, stainless steel, or other metal. However, support 222 could also be made of plastic, concrete, fiberglass, or other material. Support 222 also includes a protective pad 293, typically made of rubber or some other suitable material, adhered to base 270. While pad 293 is an optional component of the assembly, pad 293 helps to prevent array 212 of PV modules 214 from scratching or otherwise damaging support surface 216. As shown in FIG. 10, adjacent rows of PV modules 214 can be spaced apart sufficiently to provide a walkway 294 between the rows.

Figure 11:
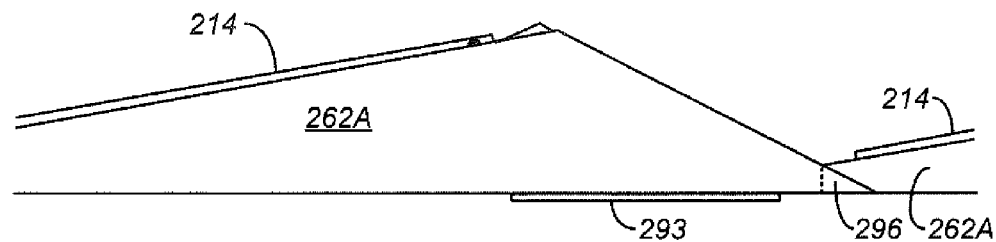
FIG. 11 is a view similar to FIG. 10 showing the use of an extended side air deflector.

FIG. 11 discloses an alternative embodiment using extended side air deflectors 262A, the extended side air deflectors overlapping somewhat at 296. Using this type of side air deflector may eliminate the need for using a curb, or other peripheral barrier, surrounding array 212.

Figure 12:
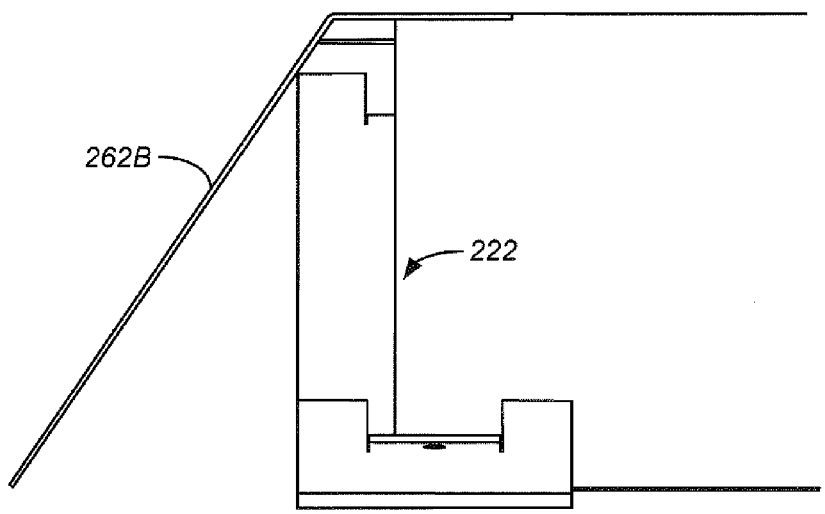
FIG. 12 is an end view illustrating an angled side air deflector as an alternative to the generally vertical side air deflector of FIG. 1.

FIG. 12 illustrates a further embodiment in which the side air deflector is an angled side air deflector 262B. Such an angled side air deflector is presently preferred; however, manufacturing problems are typically greater than with the vertical side air deflectors.

The above disclosed embodiments disclose the use of conventional PV modules. If desired, the PV modules could be of the light concentrator type. Light concentrator types of PV modules typically have an array of lenses or other light concentrators positioned above the PV substrate so to increase the intensity of the light received by the PV substrate. This permits the percentage of the active, electricity-generating area of the PV substrate to be reduced when compared with non-light-concentrator types of PV substrates. This helps to make using more efficient electricity-generating materials on the PV substrate more cost-effective.

FIGS. 13-16 disclose further aspects of the invention. A supported PV assembly 302 includes a PV module 304 to be supported by PV module support assemblies 306. When PV assembly 302 is a tilted or inclined PV assembly, it preferably includes a rear or north air deflector 308 mounted to support assemblies 306 with the upper edge 310 of air deflector 308 near but spaced apart from the north or upper edge of 312 of PV module 304. Support assemblies 306 are constructed to support the north edges 312 of one row of PV modules 304 and the lower or south edges 314 of an adjacent row of PV modules 304.

Support assembly 306 includes a north edge module support 316 secured to PV module 304 at the northeast corner 318 and at the northwest corner 320 of the PV module using north edge mounting elements 322. Support 316 includes a support surface 324 at the upper end of a support arm 325 on which corners 318, 320 rest. Support 316 also includes module registration members 326, 328 configured to engage PV module 304 as it is lowered vertically onto supports 316 to help guide the module into proper engagement with supports 316. In particular, angled module registration number 326 can engage north edge 312 of PV module 304 as it moves vertically downwardly to help ensure the proper north-south positioning of the PV module. Proper East-West registration is aided by positioning module registration number 328 within an appropriate opening or recess within the underside of PV module 304 while threaded stud 330 extending upwardly from support surface 324 is spaced apart a short distance from the lateral edge 332 of PV module 304.

PV module 304 includes a PV panel 334 enclosed by metal frame 336. Mounting element 322 has teeth 338 which engage and make good electrical contact with frame 336 so to provide good grounding between PV module 304 and support assemblies 306. In some embodiments a frameless PV module may be used. However, the frameless PV module would need to be provided appropriate mounting surfaces for proper mechanical engagement with and grounding of support assemblies 306.

Support assembly 306 includes a south or lower edge module support 340 by which the southeast and southwest corners 342, 344 are secured to support assemblies 306 using south edge mounting elements 346. Support 340 is similar to support 316, with like reference numerals referring to like elements, except for the height of support arm 325. Both north edge and south edge mounting elements 322 and 346 are secured to their respective threaded studs of 330 using nuts 348 and washers 349.

Mounting element 322 includes an air deflector mounting arm 350 from which a pair of threaded studs 352 extends. A threaded stud 352 passes through a laterally extending slot 354 at each end of the upper edge 310 of air deflector 308. Nuts 348 secure upper edge 310 to mounting arm 350 of mounting element 322. A pair of apertured tabs 356 extends generally horizontally from the lower edge 358 of air deflector 308. Threaded studs 360 extending upwardly from the base 362 of support assembly 306 pass through the apertures within apertured tabs 356 to permit air deflector 308 to be secured to support assembly 306 using, typically, nuts 348.

Figure 17:
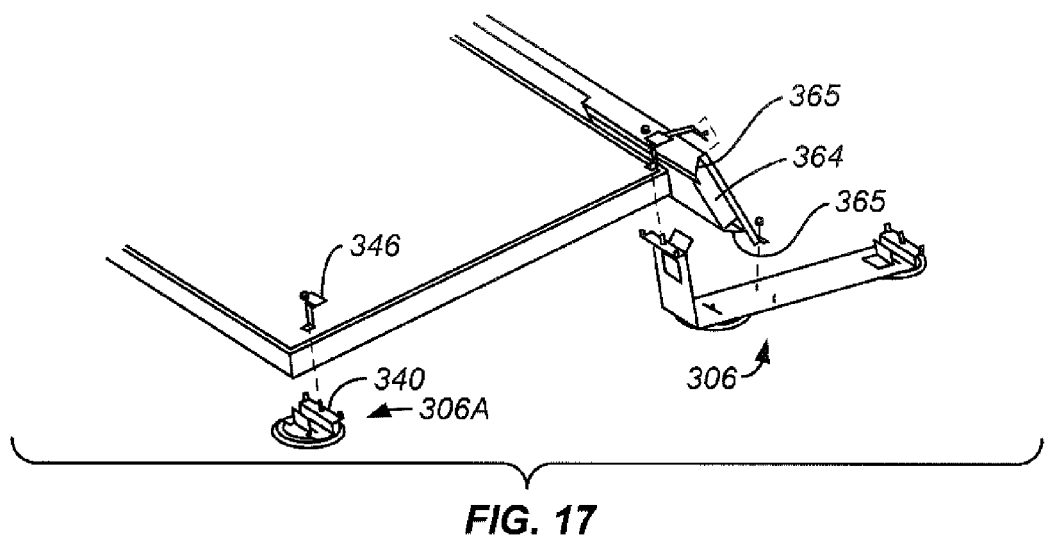

FIG. 17 illustrates a support assembly 306A including only a south edge module support 340. Support assemblies 306A are typically used along the south most row of PV modules 304. They can also be used, for example, when one or more PV modules are adjacent to a barrier such as a skylight or an extended-width walkway. FIG. 17 also illustrates placement of a ballast 364 against the underside of air deflector 308. The inner surface of their deflector 308 has clip-like ballast support structure 365 securing ballast 364 beneath the inner surface of the wind deflector. This permits ballast 364 to be either pre-mounted to air deflector 308 or mounted to the air deflector after the air deflector has been mounted to support assemblies 306 by being inserted sideways between support structure 365.

Figure 18:
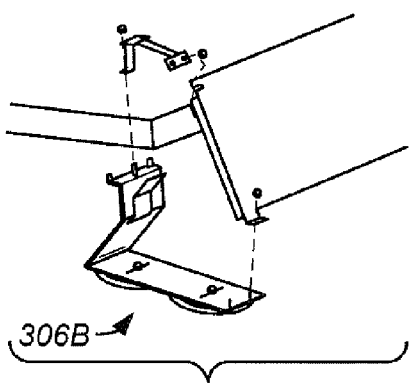

FIG. 18 illustrates the use of a support assembly 306B including only a north edge module support 316. Similar to support assemblies 306A, support assemblies 306B are used along the north most row of PV modules 304 or when one or more PV modules are adjacent to a barrier such as a skylight or an extended-width walkway.

Figure 19:
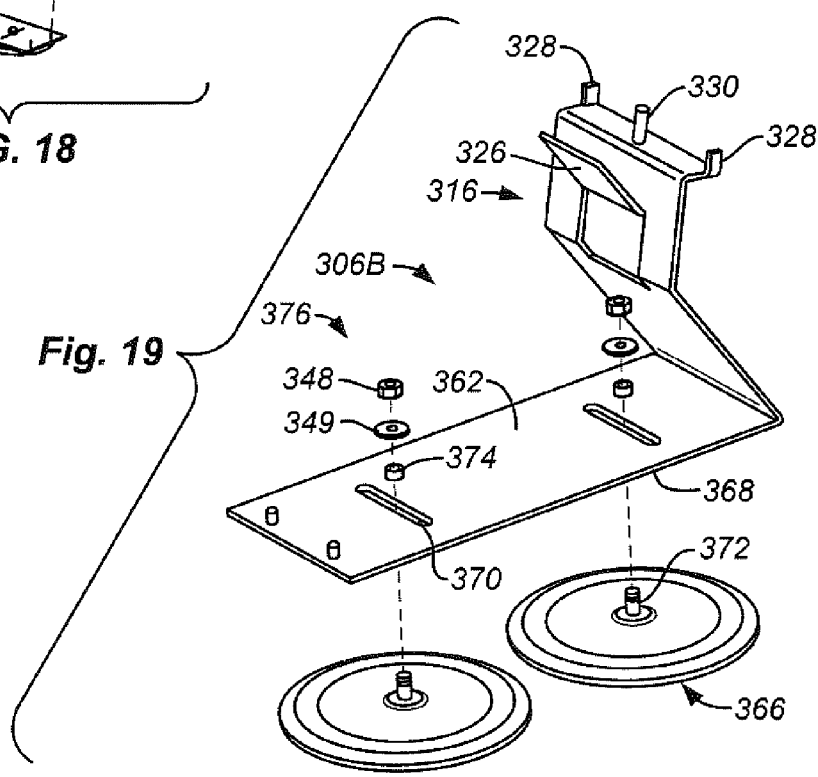

FIG. 19 illustrates mounting of support pads 366 beneath the lower surface 368 of base 362 of support assembly 306B. Base 362 has a pair of slots 370 formed therethrough. Slots 370 are oriented in a generally east-west direction. Each support pad 366 has a threaded stud 372 extending upwardly from the center. Threaded stud 372 passes through slot 370 to permit support pad 366 to be secured to base 362 using nut 348, washer 349 and a bushing 374 with washer 349 lying against the upper surface 375 of base 362 and bushing 374 within slot 370. This arrangement creates a thermal expansion and contraction movement-accommodating joint 376, also called a thermal joint, to secure base 362 and pads 366 to one another but permit movement of base 362 and support 316 therewith in the direction of slots 370 relative to pads 366. This permits thermal expansion and contraction of the various components in a row of PV modules 304 to be accommodated. If desired, some or all of the support assemblies could be provided thermal joints that would accommodate thermal expansion and contraction in other directions, such as north-south directions. Also, thermal joints could be provided to accommodate thermal expansion and contraction in any direction parallel to the support surface. In any event, providing thermal joints 376 permits pads 366 to remain in place on and not slide over the support surface because of thermal expansion and contraction movements of PV modules 304 to help prevent undesirable wear on the support surface.

The use of support assemblies 306 accommodates thermal expansion and contraction along a row of PV modules 304. However, support assemblies 306 are constructed to effectively present horizontal separation of adjacent assemblies, thereby preventing horizontal separation of the adjacent PV assemblies, but are sufficiently flexible to permit the PV module support assemblies to flex to permit the array of PV modules 304 to follow the contour of an other-than-flat support surface. Connecting adjacent PV modules 304 to one another helps to counteract wind uplift forces by distributing a temporarily high wind uplift force on a PV module 304 to its adjacent PV modules.

Figure 20:
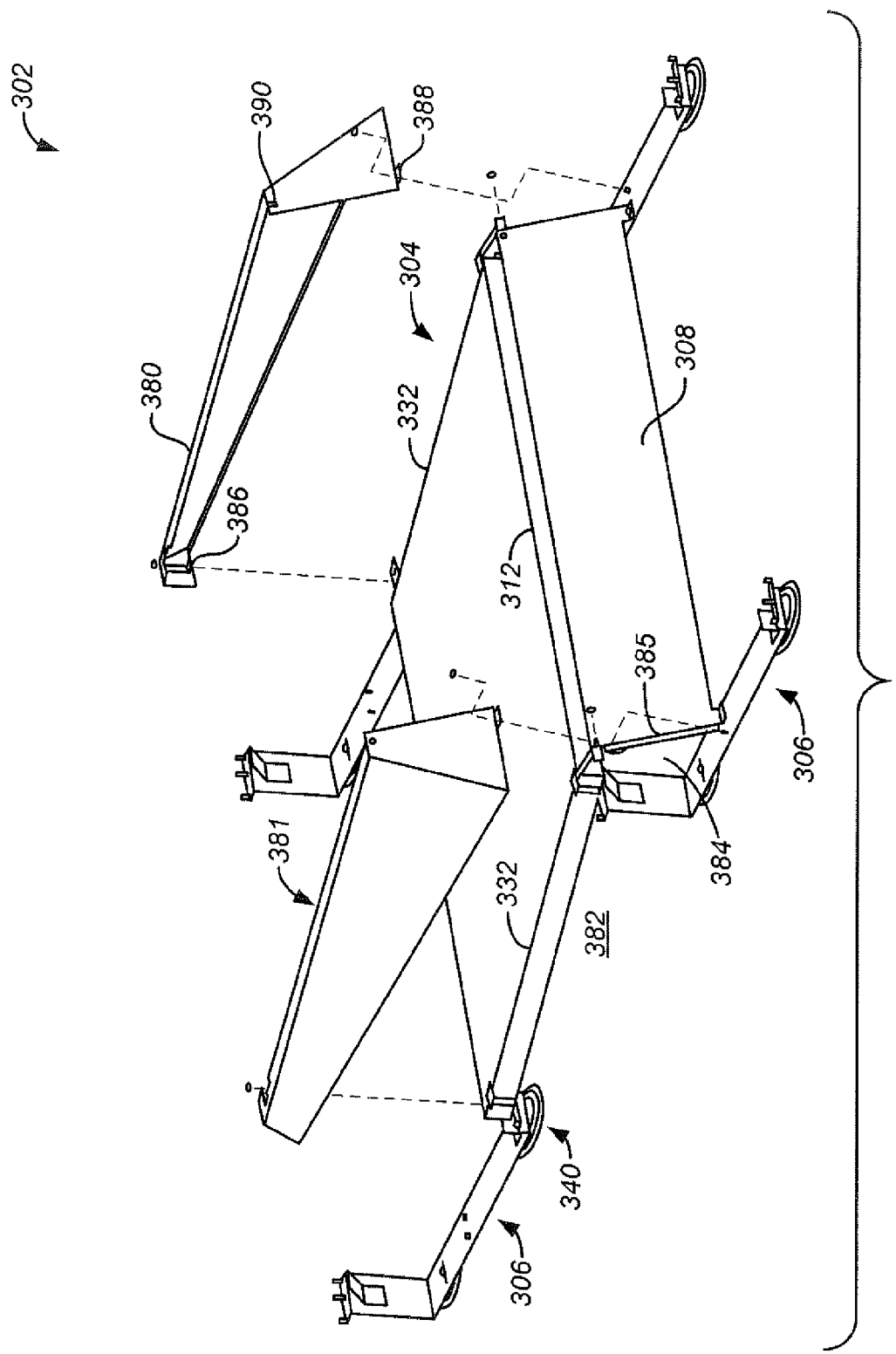

FIG. 20 illustrates mounting side air deflectors 380, 381 adjacent to lateral edges 332 of PV module 304. Side air deflectors 380, 381 are, like north air deflectors 308, mounted to support assemblies 306. Side air deflectors 380, 381 are used when another PV module 304 is not mounted adjacent to lateral edges 332 to help prevent undesirable wind uplift forces but helping to prevent wind from passing beneath PV module 304 through open regions 382, 384, the open regions defined beneath lateral edge 332 and the lateral edge 385 of air deflector 308. Side air deflectors 380, 381 have apertured tabs 386, 388 and a slot 390 positioned to engage threaded stud 330 of south edge module support 340, threaded stud 360 of support assembly 306, and threaded stud 352 of mounting element 322. Nuts 348 and washers 349, as appropriate, are used to secure side air deflectors 380, 381 in place.

Figure 21:
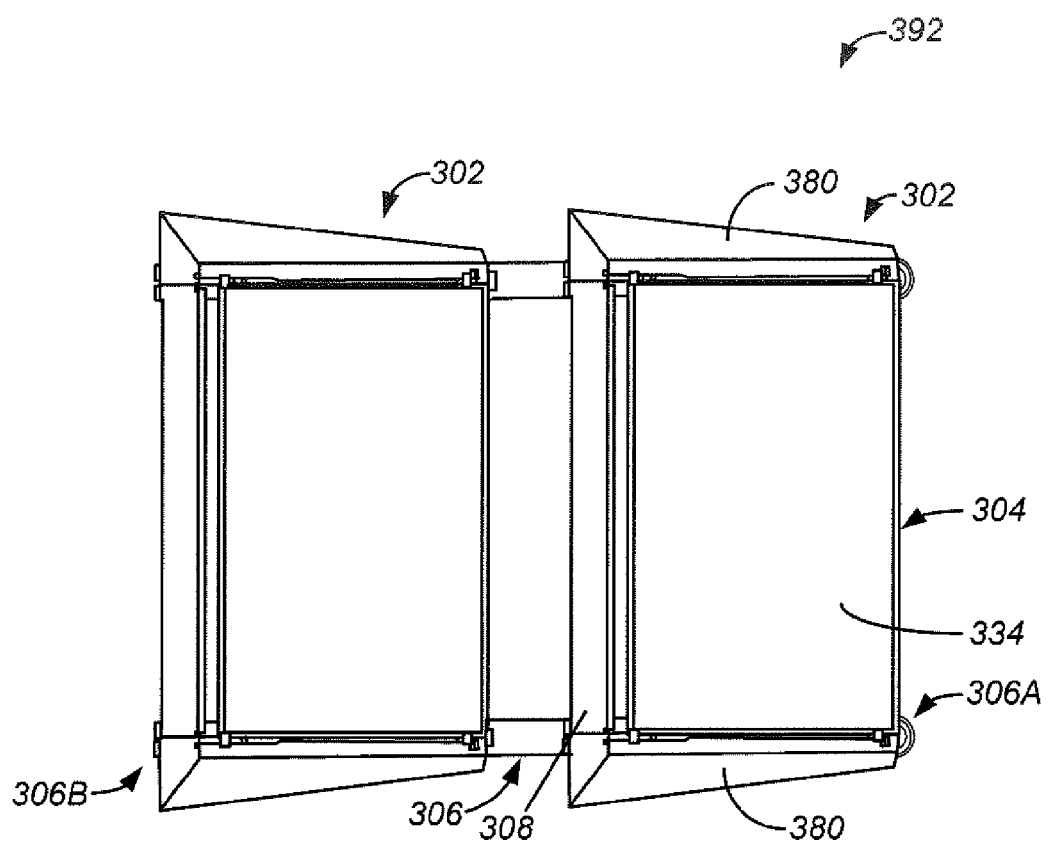
Figure 22:
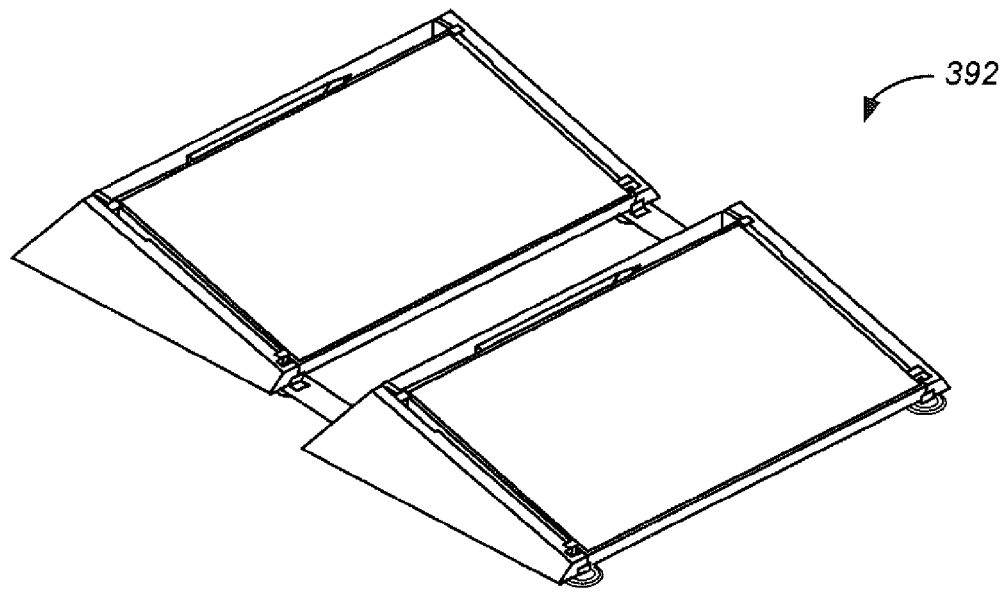

FIGS. 21 and 22 illustrate a simple, two-assembly array 392 of the supported PV assemblies 302 of FIG. 20. Arrays of rows of assemblies 302, similar to the array of FIG. 1, would be more typical. The length of base 362 of support assembly 306 is chosen to minimize and shading of adjacent rows of PV panels 334 and may be chosen to be sufficiently long to provide a walkway between adjacent rows.

FIGS. 25-29 illustrate the use of row and column stabilizing members 396, 398 in an array 392 of PV modules. The rows are typically oriented in an east-west and direction while the columns are oriented in a north-south direction when PV modules 304 are inclined towards the south. Stabilizing members 396, 398 are used to help make array 392 self-stabilizing when resisting wind loads, especially for higher wind speeds. Stabilizing members 396, 398 provide a mechanism for transmitting loads laterally. This allows one section of array 392 to stabilize other sections of the array. Column stabilizing members 398 are in this embodiment lengths of wire rope placed in tension between adjacent support assemblies 306. Alternatively, column stabilizing members 398 could be lengths of, for example, other flexible tensile members or solid rods extending between adjacent support assemblies 306 or along a series of support assemblies 306. Column stabilizing members 398 are used along some or all of the columns of support assemblies 306 as required by site wind conditions. Row stabilizing members 396 are typically rigid beams which preferably span several support assemblies 306. Although row stabilizing members 396 are typically only used along the north most row and along the south most row, they may be used at other locations as well depending upon wind conditions and local circumstances. Alternatively, array 392 can be secured through physical connections to anchor points distributed on the roof or other support surface 324.

Figure 23:
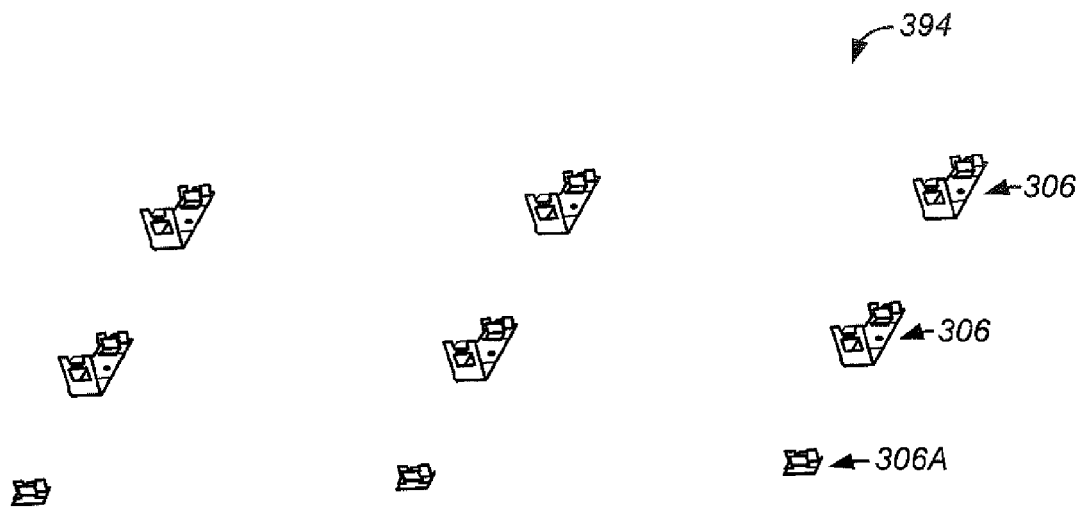
Figure 24:
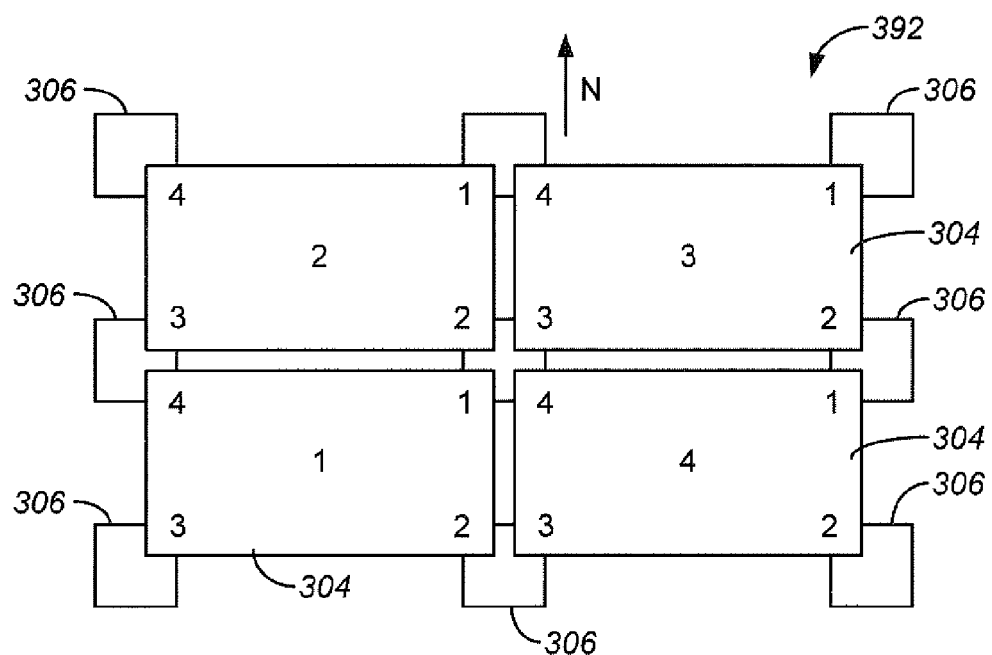
Figure 25:
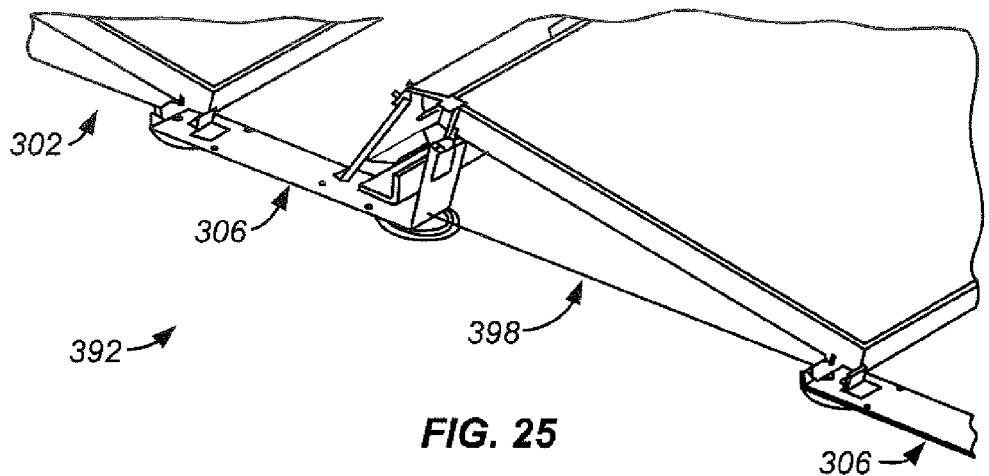
FIGS. 25-29 illustrate the use of row and column stabilizing members in an array of the PV modules.
Figure 26:
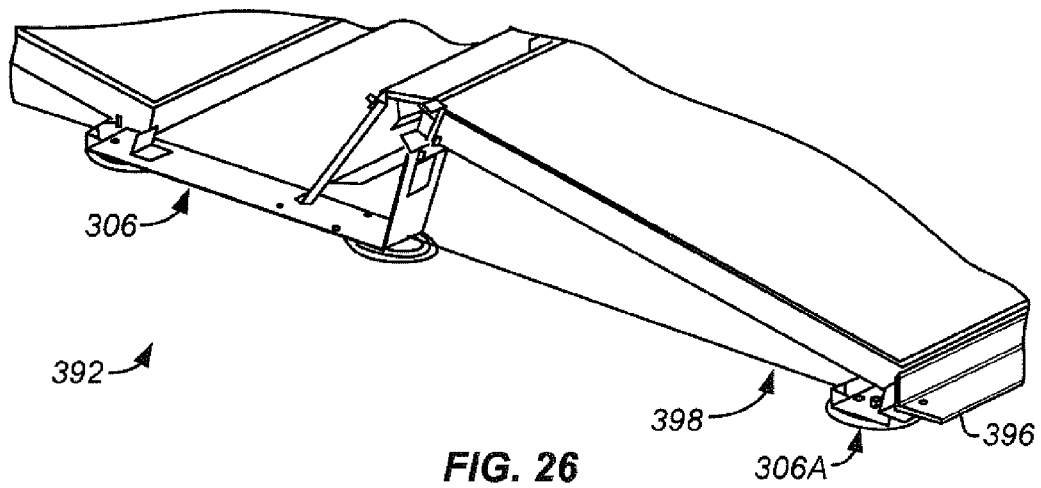
Figure 27:
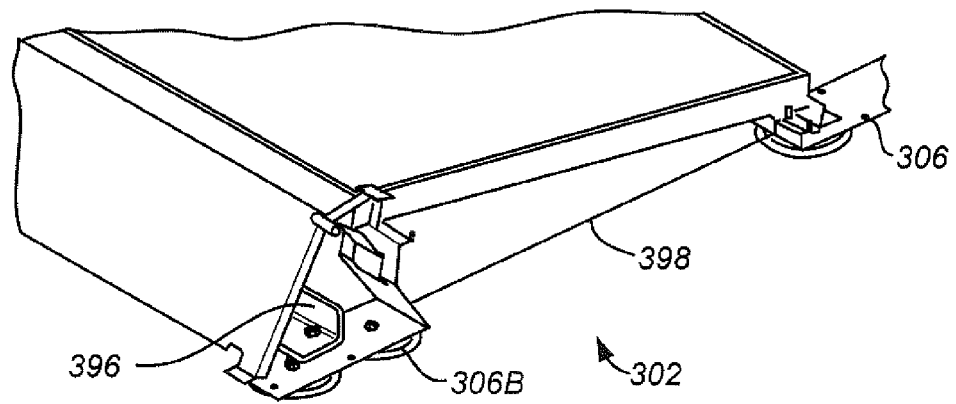
Figure 28:
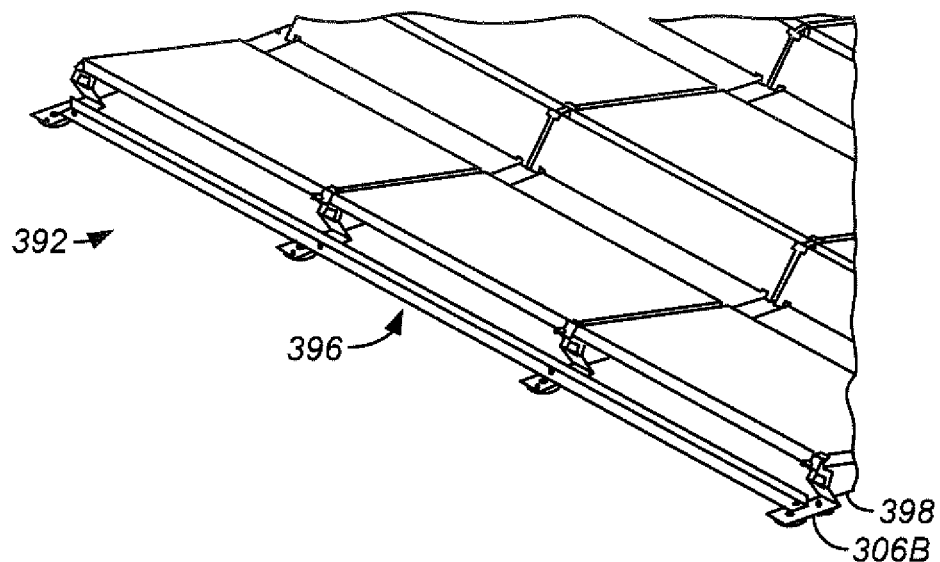
Figure 29:
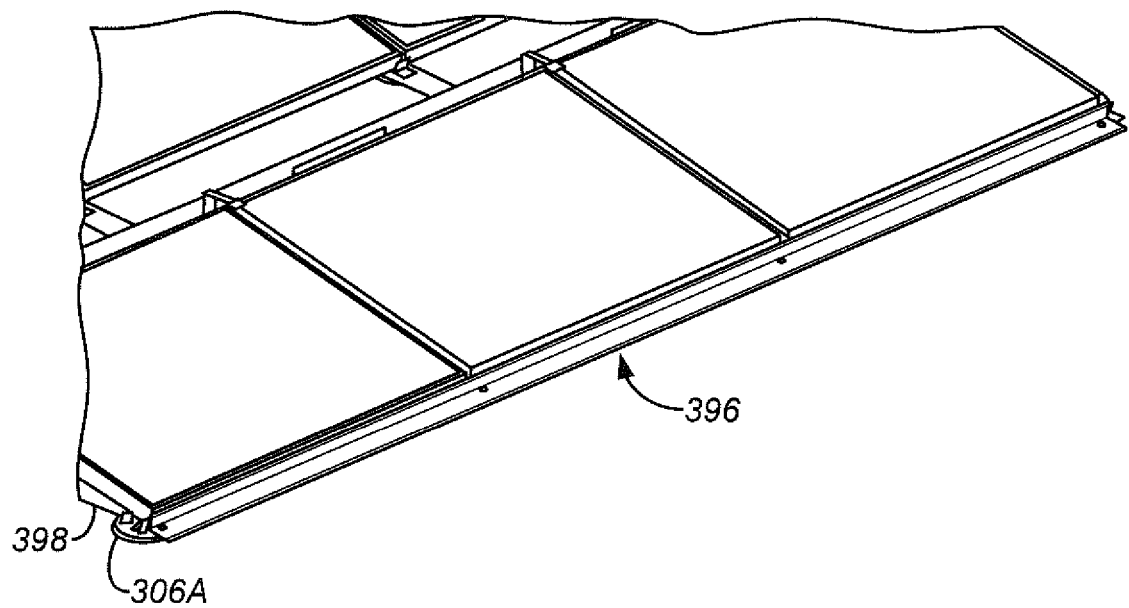

In use, a pattern or array of support assemblies 306 is laid out at appropriate positions on the support surface. FIG. 23 illustrates a small pattern or array 394 of support assemblies 306 sufficient for a four-panel array 392 of PV modules 304, illustrated schematically in FIG. 24. Array 394 of support assemblies 306 is properly positioned on the support surface, typically through the use of lightweight spacers or other positioning guides and, when used, through the use of row and column stabilizing members 396, 398. PV modules 304 are then vertically aligned above a corresponding set of support assemblies 306 and then moved downwardly onto the support assemblies. Registration members 326, 328 and threaded studs and 330 help to guide PV module 304 into proper engagement with both north edge module support 316 and south edge module support 340 of support assemblies 306. After PV modules 304 are properly positioned and supported by support assemblies 306, the PV modules are secured in place using mounting elements 322, 346. Next, appropriate wiring connections are made. Thereafter, North and side air deflectors 308, 380 are secured to mounting elements 322, 346 along the raised or upper, north edge 312 of PV panels 304 and along the exposed lateral edges 332 of the east-most and west-most PV panels. Securing PV modules 304 and air deflectors 308, 380 to support assemblies 306 can be accomplished using a simple tool, such as a nut driver, to make the installation process simple and straightforward.

Figure 30:
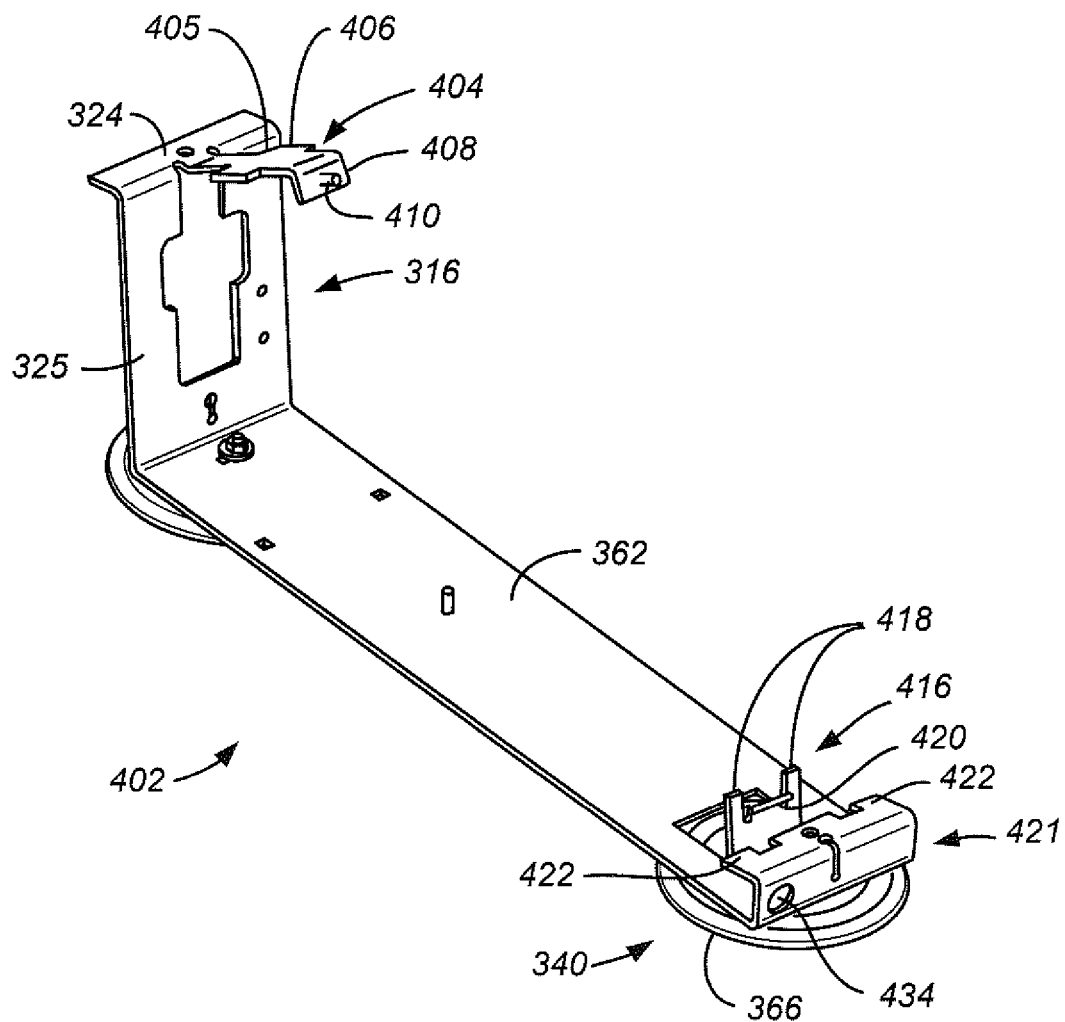
FIG. 30 shows an alternative embodiment of the PV module support assembly of FIG. 14.

FIG. 30 shows an alternative embodiment of PV module support assembly 306. Support assemblies 402 and 402A (see FIG. 35) are similar to support assemblies 306 and 306A with the following primary differences. Support assembly 402 uses an external upper module registration member 404 extending from the support surface 324 of support arm 325. As shown in FIGS. 31 and 32, member 404 has laterally extending tabs 406 that create L-shaped surfaces 405 which engage the outside of PV module 304 at the northeast and northwest corners 318, 320. This allows a support assembly 402 to be used with virtually any PV module 304. In addition, registration member 404 includes a deflector support 408 extending from the distal end of registration member 404. Deflector support 408 includes a threaded stud 410 that passes through slot 354 along the upper edge 310 of north air deflector 411. Support assembly 402 is used with a mounting element 412, see FIG. 33, and a mounting bolt 414 to secure PV module 340 to support surface 324 of support arm 325 of support assembly 402. This arrangement helps to ensure that the gap between upper edge 310 of air deflector 411 and upper edge 312 of PV module 304 can be easily controlled.

Figure 34:
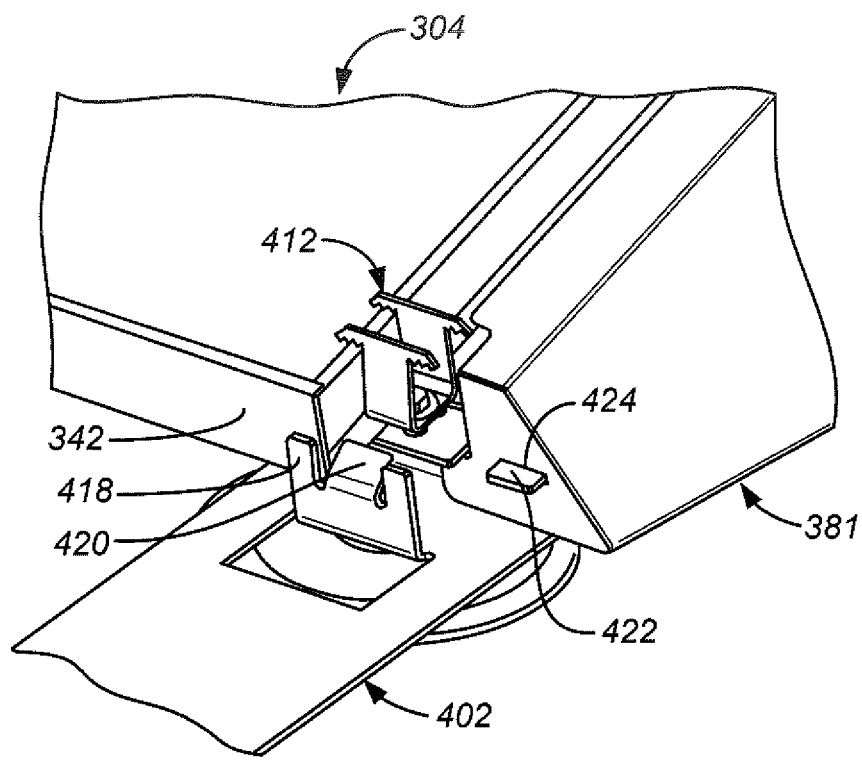
FIG. 34 and FIG. 35 show securing the south end of a PV module to the South edge module support of the support assembly of FIG. 30.
Figure 35:
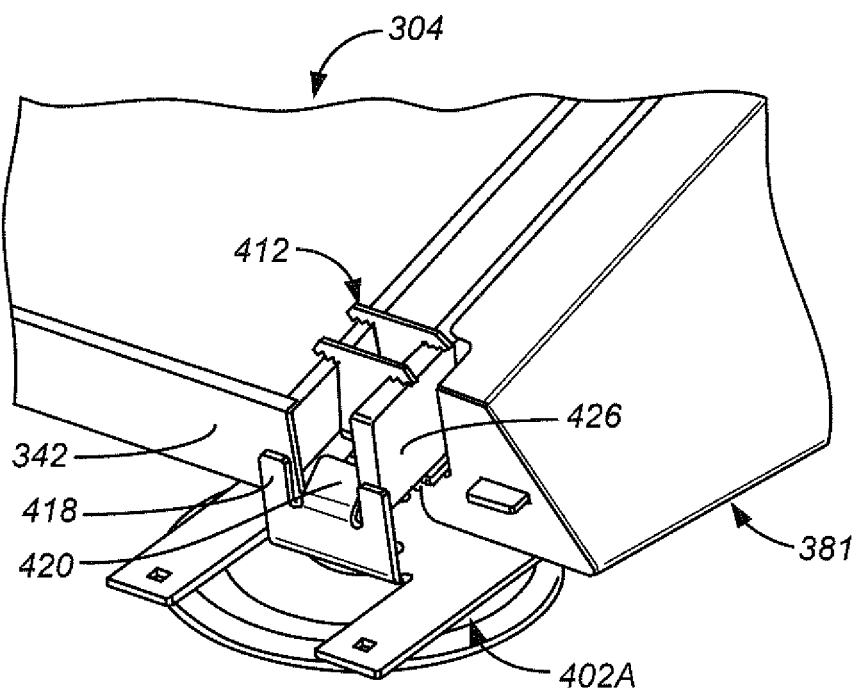

FIGS. 30 and 34 illustrate an external lower module registration member 416 of the south edge module support 340. Registration member 416 includes a pair of upwardly extending fingers 418 and an upwardly and outwardly extending finger 420 which engage the outside edge of PV module 304 at the southeast and southwest corners 342, 344 of the PV module. FIG. 35 also shows how mounting element 412 is used to engage PV module 304 and, along the lateral edges of the array, side air deflectors 380, 381 by the engagement of mounting block elements 426 of the side air deflectors. Mounting block element 426 has been omitted from FIG. 34 for clarity. Note that the same mounting element 412 can be used at all four corners of PV module 304. Also, registration member 416 includes a re-curved portion 421 having a pair of inwardly extending tabs 422 used to engage slots 424 at the ends of side air deflectors 381. This eliminates the need for apertured tabs 386, 388, shown in FIG. 20, to permit the parts to nest for shipping.

Figure 13:
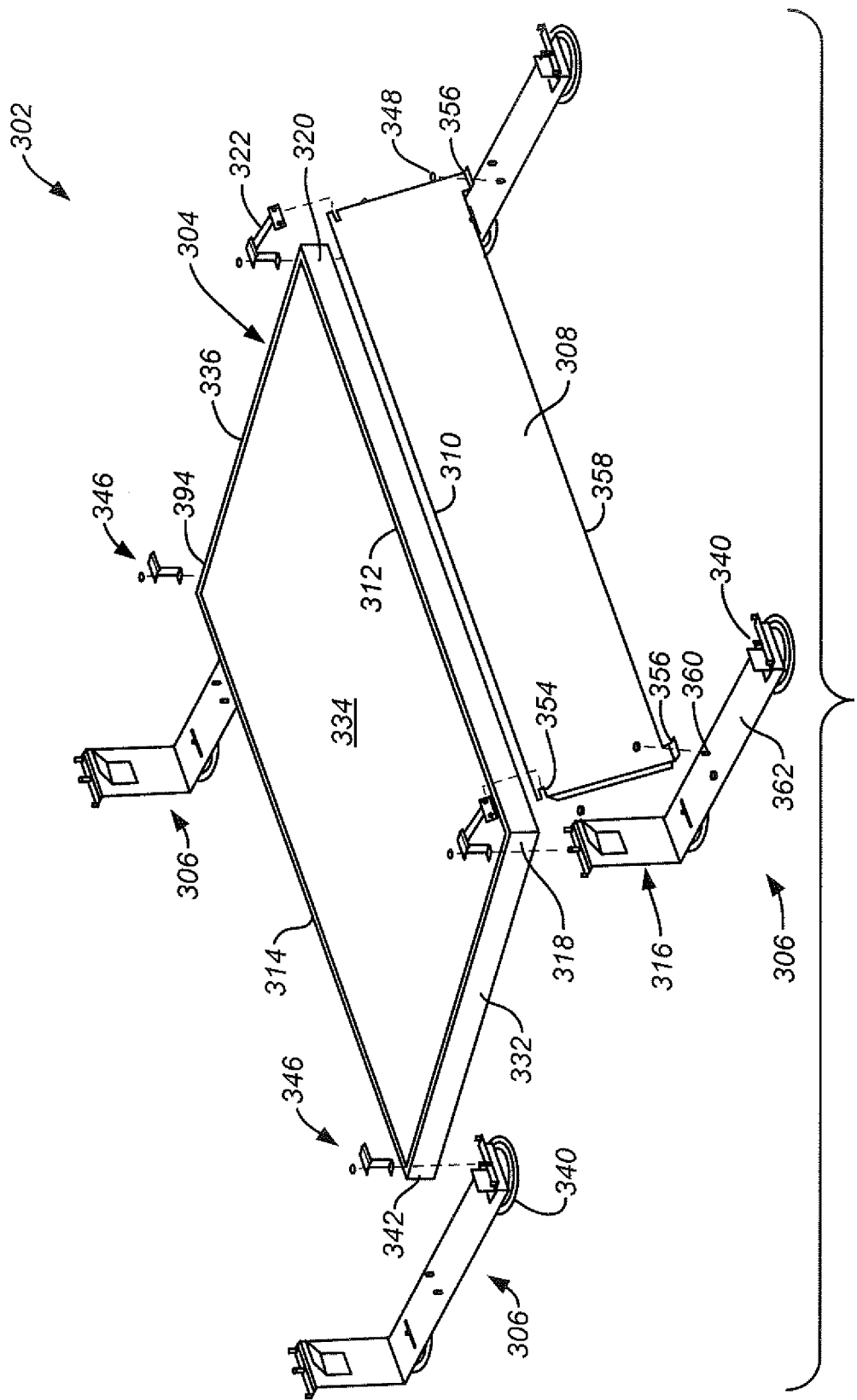
Figure 14:
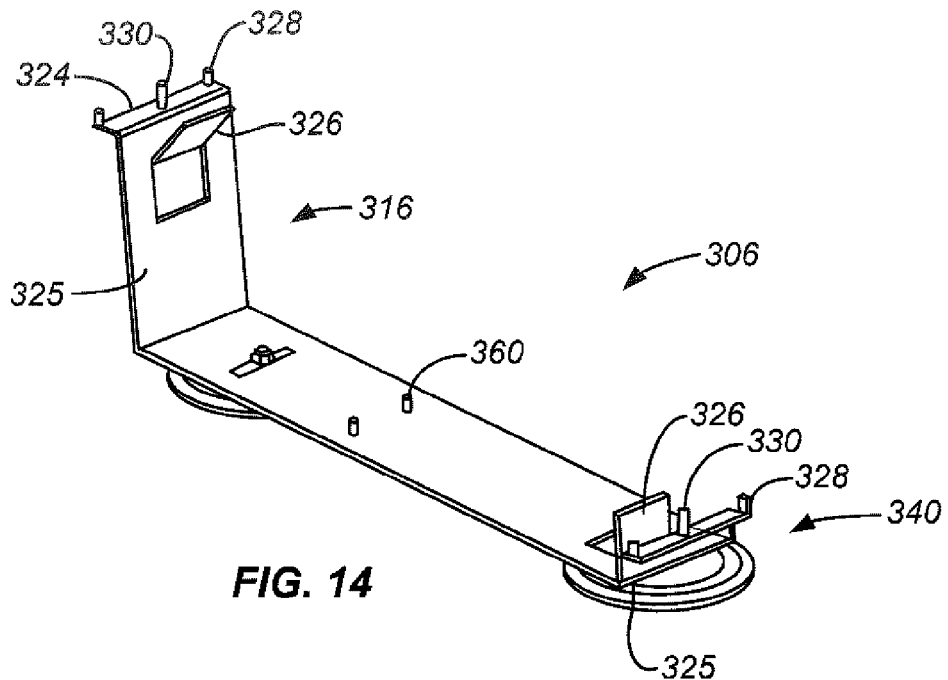
Figure 15:
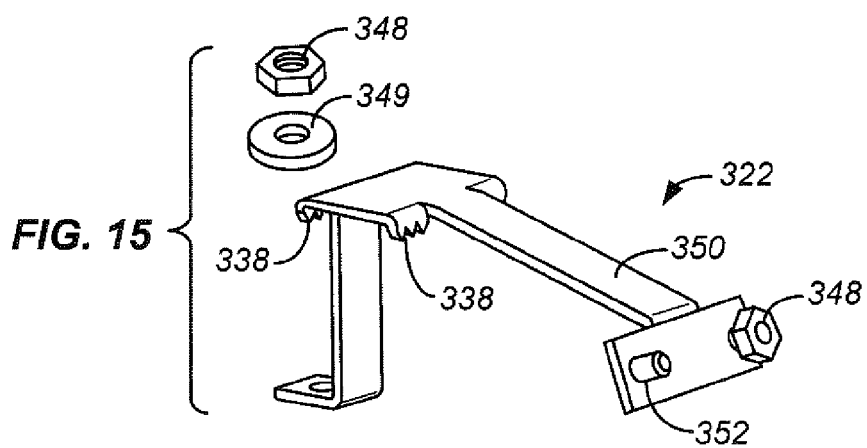
Figure 16:
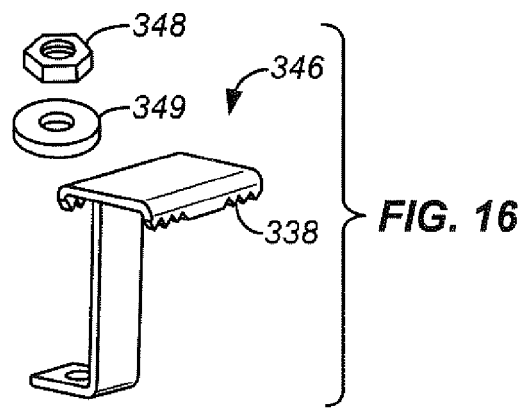
Figure 36:
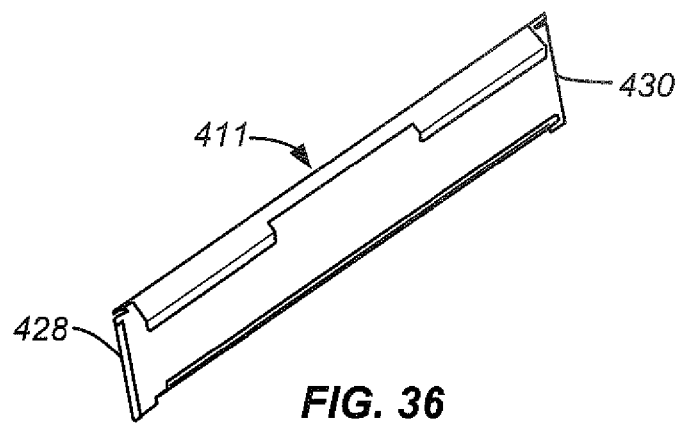
FIGS. 36-38 show an alternative embodiment of the north air deflector of FIG. 13.
Figure 37:
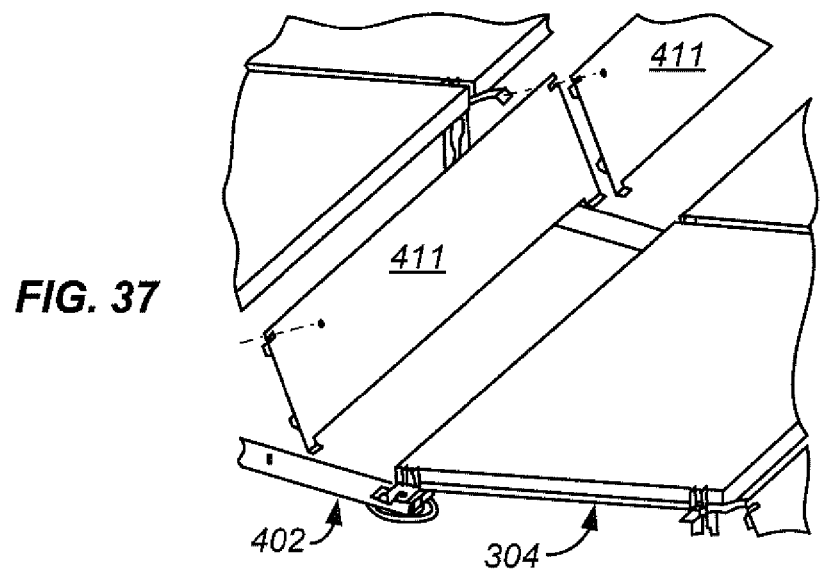
Figure 38:
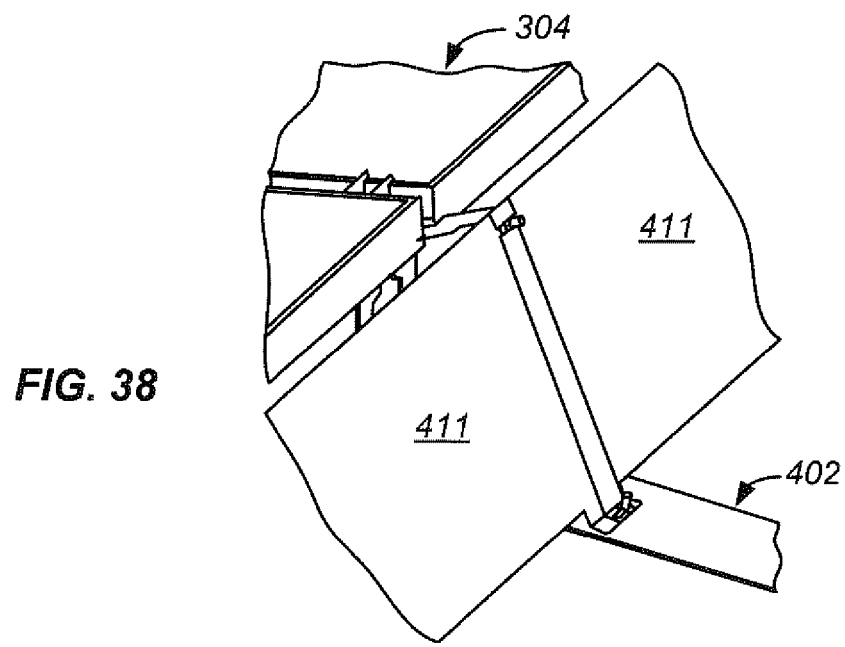

FIGS. 36-38 illustrate how north air deflector 411 is modified from the air deflector 308 of FIGS. 13 and 22 to accommodate varying roof contours. Air deflector 411 has a hem along one lateral edge 428 but not along the other lateral edge 430. This permits the adjacent edges 428, 430 adjacent air deflectors 411 to overlap and properly engage one another but to also move or shift position relative to one another according to the roof contour.

Figure 39:
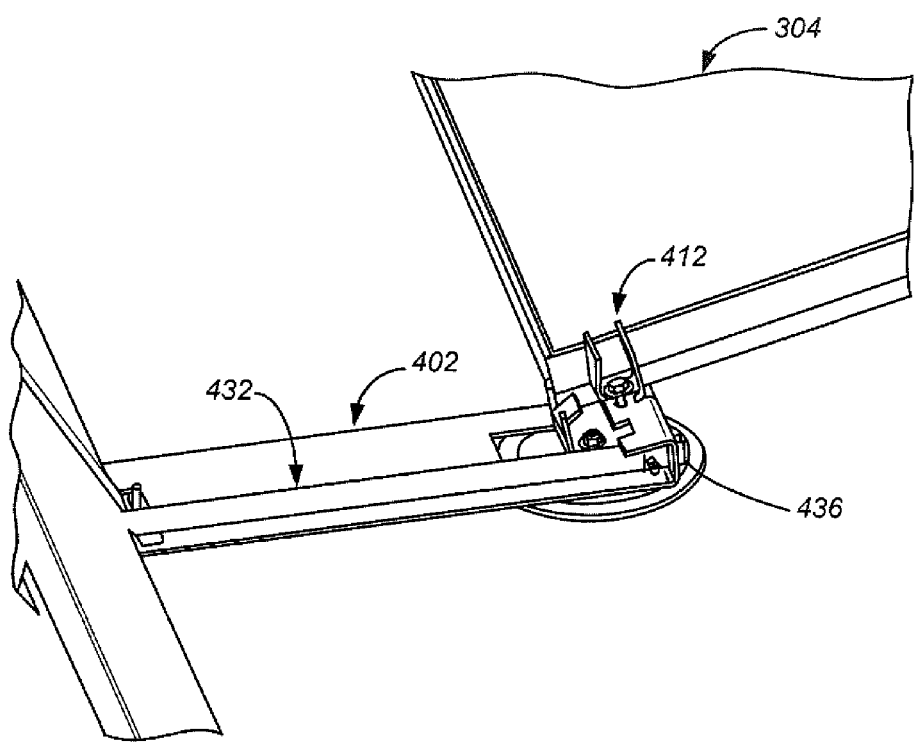
FIG. 39 illustrates the use of a protective conduit between rows of PV modules.

Most of the electrical connections between adjacent PV modules 304 take place between adjacent modules in the same row. However, occasionally electric or connection needs to be made between the modules 304 in one row and the PV modules in an adjacent room. FIG. 39 shows the use of a conduit 432 along the base 362 of support assembly 402 to protect the wires extending between the rows. Conduit 432 is secured to recurved portion 421 using a hole 434 formed in recurved portion 421 as shown in FIG. 30 and an appropriate fitting 436. Fitting 436 provides both proper location and grounding of conduit 432.

Figure 40:
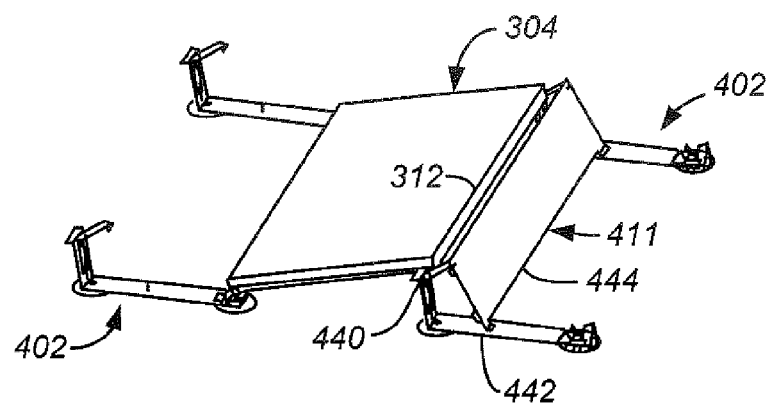
FIG. 40 illustrates a further alternative embodiment of the invention in which the PV module and the north air deflector are each pivotally secured to the PV module support assemblies and by hinge joints.
Figure 41:
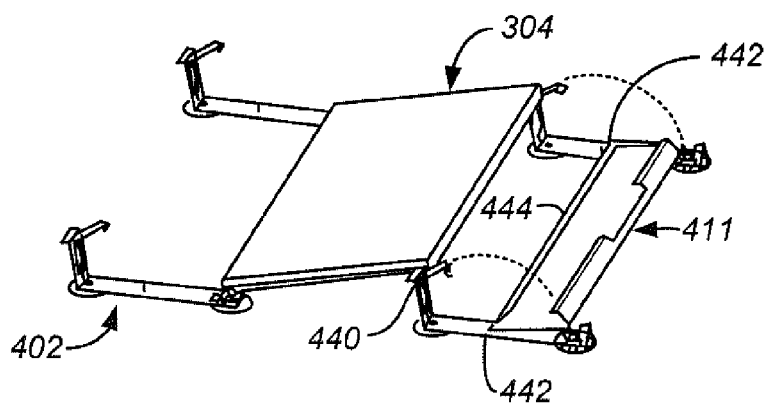
FIG. 41 shows the structure of FIG. 40 with the north air deflector pivoted outwardly to an open state.
Figure 42:
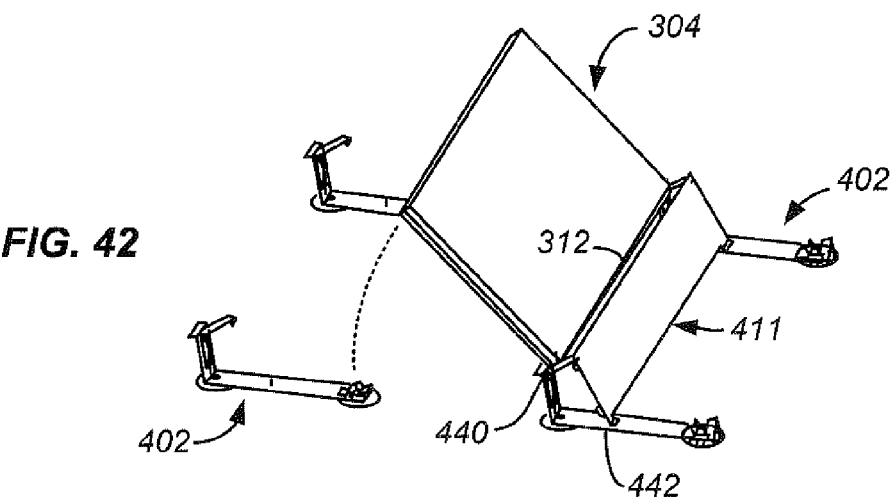
FIG. 42 shows the structure of FIG. 40 with the PV module pivoted upwardly to an open state.

FIGS. 40-42 illustrate a further alternative embodiment in which PV module 304 and north air deflector 411 are mounted to support assemblies 402 by hinged joints 440 and 442 along upper edge 312 of PV module 304 and a lower edge 444 of air deflector 411 respectively. The opposite ends of PV module 304 and air deflector 411 are secured in place using releasable fasteners, such as clips, threaded fasteners, or other suitable fasteners. North air deflector 411 can be pivoted to an open state as shown in FIG. 41. Likewise, PV module 304 can be pivoted to an open state as shown in FIG. 42. Doing one or both permits access to, for example, the support surface or the array wiring without the need for removing large components and without the need to disconnect any of the array wiring.

Figure 43:
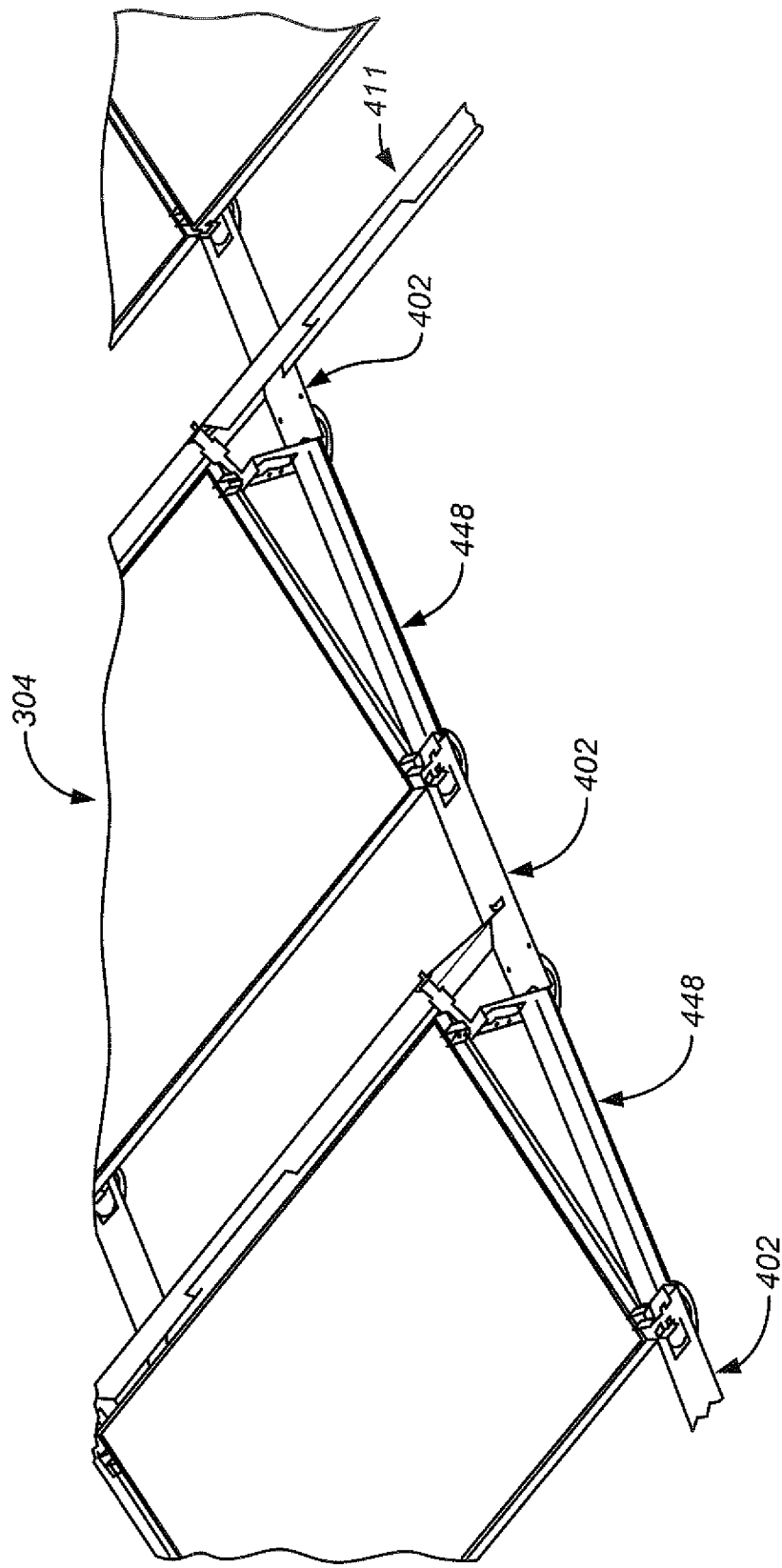
FIG. 43 shows another alternative embodiment using supports securing the PV module support assemblies at the opposite ends of the PV modules to increase the rigidity of the array of PV modules.

In some situations it may be desirable to provide additional resistance to wind uplift forces and overturning moments. To do so supports 448, shown in FIG. 43, can be used to connect adjacent support assemblies 402 to one another to permit such forces and moments imposed on one portion of the array to be transferred to the rest of the array. Supports 448 are typically made of aluminum or steel and are preferably made to be effectively rigid. Such effectively rigid connections between adjacent support assemblies 402 help to permit the entire array to behave as a rigid assembly. The use of supports 448 should not materially affect the ability of the array of PV modules to follow contours of the support surface.

The above descriptions may have used terms such as above, below, top, bottom, over, under, et cetera. These terms are used to aid understanding of the invention are not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. For example, fasteners other than threaded fasteners may be used to secure the various components together. A fire-resistant fire shield, as disclosed in U.S. patent application Ser. No. 11/140,261 entitled Fire Resistant PV Shingle Assembly, with or without a thermal insulation layer, may be used with the present invention.

Any and all patents, patent applications and printed publications referred to above are incorporated by reference.

What is claimed is:

1. A supported PV assembly comprising:
at least first and second PV modules comprising first and second PV panels, respectively; and
a plurality of PV module support assemblies, at least one of the PV module support assemblies comprising:
a base having first and second portions;
a module support integrally formed with, and extending from the base, the module support having, formed as a single piece:
a first support arm extending upwardly from the first portion of the base and having an upper end;
a support surface at the upper end of the first support arm supporting the PV module;
a module registration member at the upper end of the first support arm engaging the PV module to properly position the PV module on the support surface; and
a first mounting element securing the first PV module to at least one of the base and the module support and a second mounting element securing the second PV module to the second portion of the base;
wherein the first PV module comprises intersecting edges defining corners and external surfaces at the corners, and wherein the module support comprises PV module registration members engaging only the external surfaces of the first PV module at the corners, and wherein the plurality of PV module support assemblies are separate and spaced from each other;
wherein the support surface extends below the first PV support module so as to support at least a portion of the first PV support module above the base and wherein the PV module registration member comprises a first portion extending from the PV support surface and at least a first laterally extending tab extending laterally from the first portion.

2. The assembly according to claim 1 wherein the module registration member comprises first and second module registration members engaging the first PV module at first and second positions.

3. The assembly according to claim 1 wherein the mounting element is separate from the module registration member.

4. The assembly according to claim 1:
wherein the first PV module comprises the PV panel mounted to a frame, the frame having a downwardly facing exterior surface; and
the module support engages the downwardly facing exterior surface of the frame.

5. The assembly according to claim 1 wherein:
the first PV module comprises the first PV panel mounted to a frame, the frame having an exterior surface, and
the module support engages the exterior surface of the frame.

6. The assembly according to claim 1 further comprising a hinge joint pivotally securing the first PV module to at least one of the PV modules support assembles.

7. The assembly according to claim 1, wherein the module support is formed as a single piece of material.

8. The assembly according to claim 1, wherein the support surface extends below the first PV support module so as to support at least a portion of the first PV support module above the base and wherein the PV module registration members contact the external surfaces at the corner of the PV module so as to maintain the PV module on the support surface.

9. The assembly according to claim 1, wherein the first portion and the first laterally extending tab define at least one L-shaped surface.

10. The assembly according to claim 9, wherein the L-shaped surface extends around the external surfaces of a corner of the first PV module.

11. The assembly according to claim 1, wherein the registration members further comprise a second laterally extending tab extending laterally from a side of the first portion opposite the first laterally extending tab, the second laterally extending tab defining at least a second L-shaped surface.

12. The assembly according to claim 1, additionally comprising a third PV module supported by the support surface, a corner of the third PV module engaging the second L-shaped surface.

13. A supported PV assembly comprising:
at least first and second PV modules comprising first and second PV panels, respectively and first and second frames, respectively, each of the frames comprising external surfaces; and
a plurality of PV module support assemblies, at least one of the PV module support assemblies comprising:
a base having first and second portions;
a module support integrally formed with, and extending from the base, the module support having, formed as a single piece:
a first support arm extending upwardly from the first portion of the base and having an upper end;
a support surface at the upper end of the first support arm, portions of both of the first and second PV modules resting on the support surface;
a module registration member at the upper end of the first support arm and configured to restrict movement of the first and second PV modules in at least first and second directions so as to retain the first and second PV modules in a predetermined position on the support surface, the module registration member comprising a first portion extending from the support surface and comprising at least first and second laterally extending tabs with surfaces juxtaposed to the external surfaces at corners of the first and second frames; and
wherein the plurality of PV module support assemblies are separate and spaced from each other.

14. The assembly according to claim 13, additionally comprising third and fourth PV modules, wherein the module support comprises a second support surface supporting portions of both the third and fourth PV modules and a second module registration member configured to restrict movement of the third and fourth PV modules in at least first and second directions off of the second support surface.

15. The assembly according to claim 14, wherein the support surface extends from the first end of the first support arm along a first direction, the module registration member extending from the support surface in second direction opposite of the first direction.

16. The assembly according to claim 13, wherein the support surface extends from the first end of the first support arm along a first direction, the module registration member extending from the support surface in second direction opposite of the first direction.

* * * * *